US007359942B2

(12) United States Patent
Mizushima et al.

(10) Patent No.: US 7,359,942 B2
(45) Date of Patent: Apr. 15, 2008

(54) APPARATUS, METHOD, NETWORK SYSTEM, RECORDING MEDIUM AND COMPUTER PROGRAM FOR PROCESSING TRANSMITTED INFORMATION

(75) Inventors: Yasumasa Mizushima, Kanagawa (JP); Masami Kinugasa, Tokyo (JP); Zenta Watanabe, Tokyo (JP); Masakatsu Mori, Kanagawa (JP); Fumio Koyama, Chiba (JP); Nobuaki Katsuya, Saitama (JP); Koji Hagioda, Kanagawa (JP); Haruyo Endo, Tokyo (JP); Yukihiro Fukuta, Tokyo (JP)

(73) Assignees: Sony Corporation (JP); Accenture Corporation (JP)

( * ) Notice: Subject to any disclaimer, the term of this patent is extended or adjusted under 35 U.S.C. 154(b) by 388 days.

(21) Appl. No.: 10/008,443

(22) Filed: Dec. 3, 2001
(Under 37 CFR 1.47)

(65) Prior Publication Data
US 2003/0126021 A1    Jul. 3, 2003

(30) Foreign Application Priority Data
Dec. 6, 2000    (JP) .......................... P2000-371561

(51) Int. Cl.
G06F 15/16    (2006.01)
(52) U.S. Cl. .................. 709/206; 709/219; 709/246
(58) Field of Classification Search ................ 709/201, 709/202, 238, 239, 244, 245, 246, 204–206, 709/217–219; 704/4–7
See application file for complete search history.

(56) References Cited
U.S. PATENT DOCUMENTS

| 5,613,108 | A | * | 3/1997 | Morikawa | 707/200 |
|---|---|---|---|---|---|
| 5,619,650 | A | * | 4/1997 | Bach et al. | 709/246 |
| 5,627,997 | A | | 5/1997 | Pearson et al. | 395/500 |
| 5,634,005 | A | * | 5/1997 | Matsuo | 709/206 |
| 5,734,651 | A | * | 3/1998 | Blakeley et al. | 370/392 |
| 5,740,170 | A | * | 4/1998 | Andou et al. | 370/390 |
| 5,748,894 | A | * | 5/1998 | Ishizaki et al. | 709/202 |
| 5,765,170 | A | * | 6/1998 | Morikawa | 707/200 |
| 5,822,527 | A | | 10/1998 | Post | 395/200.36 |
| 6,101,320 | A | | 8/2000 | Schuetze et al. | 395/200.36 |
| 6,141,755 | A | | 10/2000 | Dowd et al. | 713/200 |
| 6,301,554 | B1 | * | 10/2001 | Christy | 704/7 |
| 6,360,273 | B1 | * | 3/2002 | Beurket et al. | 709/244 |
| 6,400,729 | B1 | | 6/2002 | Shimadoi et al. | 370/466 |

(Continued)

FOREIGN PATENT DOCUMENTS

EP    1056247    5/2000

(Continued)

Primary Examiner—Joseph E. Avellino
(74) Attorney, Agent, or Firm—Lerner, David, Littenberg, Krumholz & Mentlik, LLP

(57) ABSTRACT

An information processing apparatus that executes processing of a message transmitted among a plurality of sites connected via a network. The information processing apparatus includes a message reception part that receives a message to execute a prescribed piece of reception processing, a rule accumulation part for accumulating rules to execute message processing, a message conversion part for executing conversion processing of a message according to the rules accumulated in the rule accumulation part, and a message transmission part for executing a prescribed piece of transmission processing of the post-conversion message.

21 Claims, 19 Drawing Sheets

U.S. PATENT DOCUMENTS

| | | |
|---|---|---|
| 6,408,350 B1 | 6/2002 | Kawamura et al. ............ 710/62 |
| 6,442,589 B1* | 8/2002 | Takahashi et al. .......... 709/203 |
| 6,601,115 B1* | 7/2003 | Yonezawa et al. ............ 710/11 |
| 6,633,630 B1* | 10/2003 | Owens et al. ............ 379/93.24 |
| 6,650,632 B1* | 11/2003 | Volftsun et al. ............ 370/352 |
| 6,693,888 B2* | 2/2004 | Cafarelli et al. ............ 370/338 |
| 6,868,498 B1* | 3/2005 | Katsikas ..................... 726/14 |
| 6,895,558 B1* | 5/2005 | Loveland .................... 715/746 |
| 6,906,829 B1* | 6/2005 | Kisono ....................... 358/407 |
| 6,941,304 B2* | 9/2005 | Gainey et al. ................. 707/10 |
| 6,959,340 B1* | 10/2005 | Najmi ......................... 709/246 |
| 6,970,907 B1* | 11/2005 | Ullmann et al. ............ 709/206 |
| 7,010,101 B2* | 3/2006 | Blumenschein et al. . 379/88.22 |
| 7,020,703 B2* | 3/2006 | Detlef ......................... 709/225 |

FOREIGN PATENT DOCUMENTS

| | | |
|---|---|---|
| EP | 1016989 | 7/2000 |
| WO | WO 9740456 | 10/1997 |

* cited by examiner

FIG. 3B

601: S.I.H.= Shipment Instruction History

602: C.H. : Claim History

603: P.H. : Payment History

604: C.L.: Cargo Location

C.P.D.C.M. : Claimed Physical-Distribution Cost Master 101

P.P.D.C.M. : Paid Physical-Distribution Cost Master

C.S.-I./-O.C. : Cargo Stock-in/-Out Cost

I.I.M. : Indemnity Insurance Master

P.S.M. : Price Settlement Master

V.S. : Vessel Schedule 451

S.I. : Shipment Instruction 452

C.T. : Cargo Trucking 453

U./C. : User/Carrier 454

V.S.P. : Vessel Schedule Portal 411

S.I.(D/O) : Shipment Instruction (D/O) Portal 412

O.T.P. : Order Trucking Portal 413

I.L.P. : Inventory Location Portal 414

G.S.P. : Global Search Portal 415

B.P.P. : Bill Payment Portal 416

FIG. 8B

R.P. : Reception Processing

C.O.S.C. : Check of Sentence Construction

D.C. : Data Conversion

D.T.T.A. : Data Transmission to Application

S.O.N.T. : Setup of Nomination Table

FIG. 9B

C.O.S.C. : Check of Sentence Construction

D.T.T.A. : Data Transmission to Application

FIG. 10B

C.O.S.C. : Check of Sentence Construction

D.T.T.A. : Data Transmission to Application

T.P. : Transmission Procession

D.C. : Data Conversion

C.O.S.C. : Check of Sentence Construction

C.O.S.C. : Check of Sentence Construction

D.R.F.A. : Data Reception From Application

C.O.S.C. : Check of Sentence Construction

D.T.T.A. : Data Transmission to Application

S.P.B.A. : Shipment Processing by Application

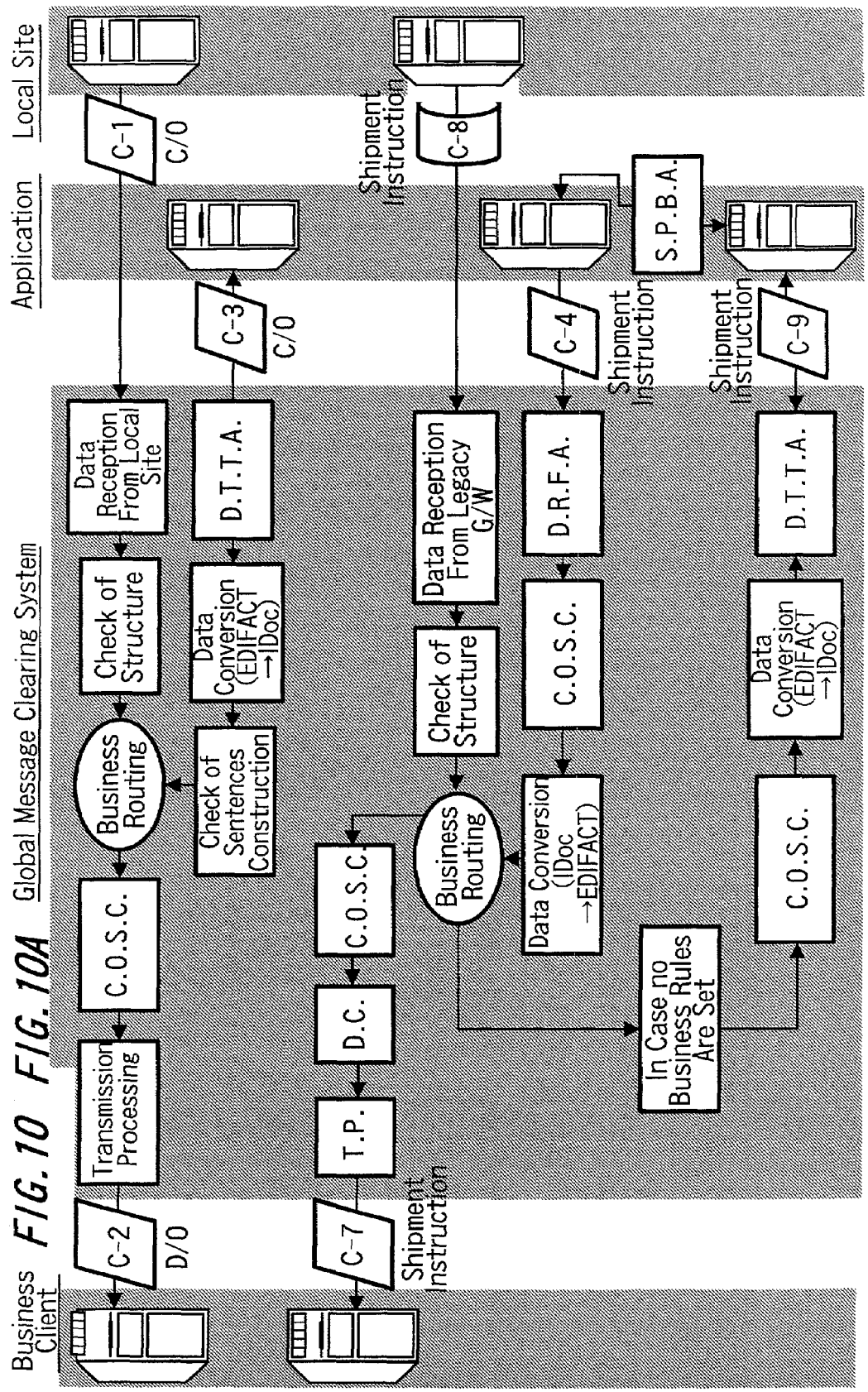

FIG. 11B

C.O.S.C. : Check of Sentence Construction

D.T.T.A. : Data Transmission to Application

C.O.S.C. : Check of Sentence Construction

D.T.T.A. : Data Transmission to Application

D.T.T.L.G/W : Data Transmission to Legacy G/W

FIG. 12B

C.O.S.C. : Check of Sentence Construction

C.O.S.C. : Check of Sentence Construction

FIG. 13B

D.R.T.A. : Data Reception to Application

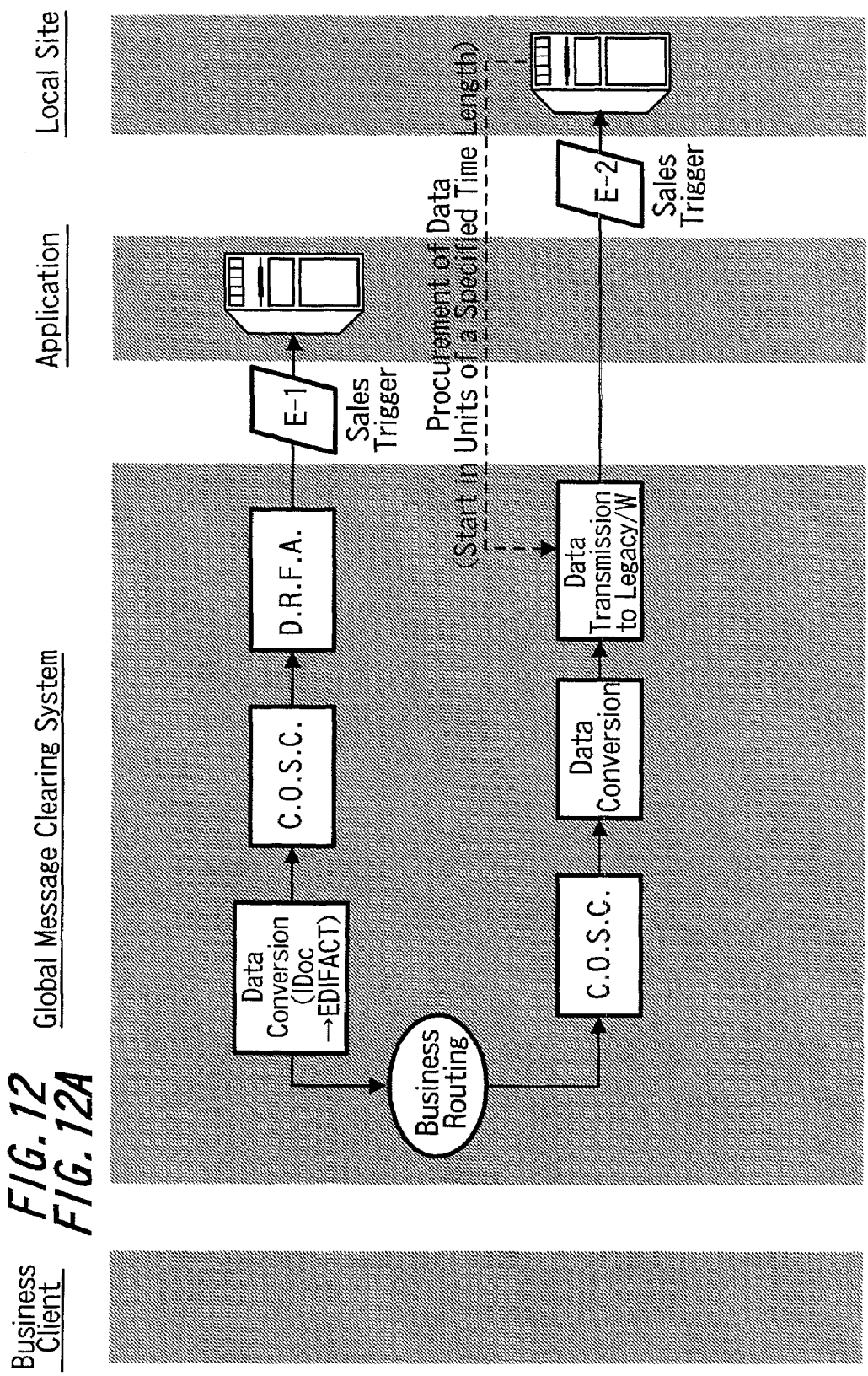

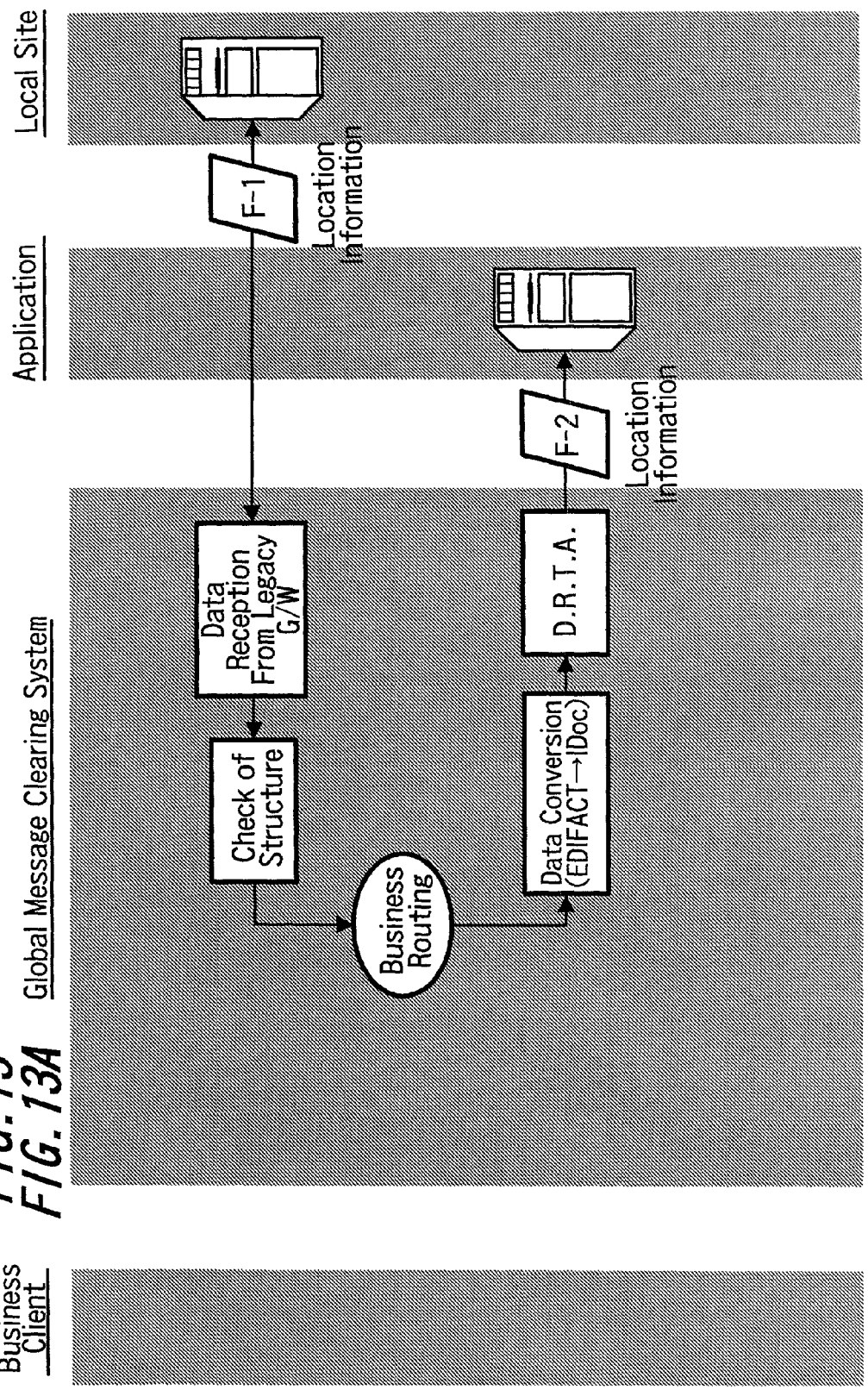

APPARATUS, METHOD, NETWORK SYSTEM, RECORDING MEDIUM AND COMPUTER PROGRAM FOR PROCESSING TRANSMITTED INFORMATION

CROSS REFERENCE TO RELATED APPLICATION

This application claims priority to Japanese Patent Application No. JP2000-371561, and the disclosure of that application is incorporated herein by reference to the extent permitted by law.

BACKGROUND OF THE INVENTION

1. Field of the Invention

The present invention relates to an information processing apparatus and method, a network system, a recording medium, and a computer program for processing a transmission message among a plurality of sites connected to one another via a network.

2. Description of the Related Art

In case shipping the products manufactured by various kinds of manufacturers, such as electrical products, abroad, the current physical distribution system resorts to the following procedures (1)~(5). However, the following explanation will be given, as an example, of a case where cargoes are exported by ship from at home to, for example, abroad.

(1) Shipping Plan

When shipping a product abroad, etc., first, there is deliberately drafted a shipping plan that is comprised of shipping base data (six items of basic information that represent "Who", "What", "How many/much", "When", "Where from", and "Where to". The shipping plan is input by, for example, a relevant person in charge inside the maker with the use of a terminal that is constituted by a personal computer (PC), etc.

(2) Booking

When the shipment plan has been determined, they obtain from a plurality of shipping companies ship departure timetables (vessel schedules) functioning as their transport schedules. On each of the ship departure timetables there is described detailed schedule data including a ship name, a tonnage, a departure port, ports of call, a departure date, etc. They finally decide the load contents, etc. according to this ship departure timetable and determine an optimum shipping company from among a plurality of the shipping companies. After having made this determination, they make temporary reservation (pre-booking) of the shipping company (tonnage). Thereafter, after final confirmation, they perform pre-booking of the tonnage. In many cases, a shipping company by-proxy performs various kinds of procedures and business operations (receipt in trust of cargoes (exportation packing jobs), custom clearance job, carrying-into-and-out-of-bonded-warehouse job, ship-loading job, etc.) necessary for exportation.

(3) Selection of Insurance Company (Damage Insurance Company)

Since the cargoes to be forwarded are done by marine transportation, most of the cargoes are insured against loss. Based on the quantity of the cargoes and shipping value of them, the consignor side calculates the amount of insurance money for the cargo. Then consignor side selects an optimum insurance company from among a plurality of the insurance companies that have shown premium rates with respect to the insurance money. The insurance contract is signed with the selected insurance company or by way of an agency. When applying for the insurance, the applicant has an insurance policy or an insurance certificate issued according to the contents of his letter of application.

(4) Selection of Domestic Transport Trader

To load up freight from the warehouse (one within a maker's factory, a designated one, etc.) having the freight kept in custody and convey it up to a designated place, they select an optimum domestic transportation trader from among a plurality of the registered transportation traders (such as by-truck transportation traders).

(5) Ship-Loading and B/L Insurance

When a maker's designated cargo is loaded into a ship, after this shipment is confirmed, a bill of lading (Bill of Lading: a bill of lading) is issued from the shipping company. For instance, in case of an air cargo, an AWBC (an air waybill: a letter of cargo transportation) is issued.

After completion of the above-described various kinds of procedures, the cargo is delivered from the maker to a foreign trader or client (business client)

To establish a system of physical distribution, in respective courses of making or receiving orders for things or services, a wide variety of items of information must be exchanged between the clients and traders. In the conventional type of physical-distribution system, various kinds of transaction information items have been directly exchanged between one client and one trader, between one client and a plurality of traders, or between a plurality of clients and one trader.

SUMMARY OF THE INVENTION

However, in case transaction information is individually exchanged as the occasion arises between one client and various traders in that way, communication jobs concerned with various kinds of relevant information items inconveniently occur by the number of the other parties. This is inefficient and has difficulty in dynamically selecting a transaction partner and making the business develop advantageously.

Also, with the conventional physical-distribution system, there have been carried out operations to select a proper physical-distributor for each of the shipping contents with real time processing after receiving information on the shipping instructions. However, such operations have been very difficult to be carried out by a computer system. That is, a large scale on-line transaction system has to be introduced in order to realize the conventionally same selection operations. For this reason, it is necessary that the selection/determination of the physical distributor be made on the side of a cargo consignor that is a shipment-instructing destination. The real-time processing in this case means the level at which data on 20, 000 cases are processed within 1 hr. Accordingly, the business on which to collect information from a plurality of cargo consignors (clients), to select an optimum trader, and to distribute the information to a plurality of different traders was virtually impossible to realize with the conventional computer network.

Also, there is a case in which the language used is different by client as well as trader (business client). Therefore, it was difficult to perform free exchange of transaction information between each two different enterprises. There haven't existed any seamless mechanisms that enable mutual communication to be made between the enterprise on the information origin side and the enterprise on the information reception destination side even when the system languages differ. Therefore, the exchange/flow of the transaction information were inefficient.

In recent years, computer networks have widely been adopted by various kinds of businesses for the purpose of collection/accumulation, joint possession, and circulation of information as well as for the purpose of performing joint operations by the users. Thereby, the computer networks have come to be used in each scene of the businesses such as physical distributions or sales. However, no instances have been witnessed where computer networks are utilized for collecting information from a plurality of clients, selecting an optimum trader, and distributing information among a plurality of different traders.

The present invention is implemented to address the afore-mentioned problems. It is desired to provide an information processing apparatus and method, a network system, a storing medium, and a computer program, which are capable of processing more efficiently a transmission message among a plurality of sites connected one another via a network.

According to an embodiment of the present invention there are provided an excellent information processing apparatus and method, a network system, a recording medium, and a computer program which enable concentrated performance of the physical processings comprised of drafting of shipping plans, selection decisions on traders concerned with the shipment/physical distributions, etc.

According to another embodiment of the present invention, there are provided an excellent information apparatus and method, a network system, a recording medium, and a computer system which use a network adapter on the communication network line or single-purpose network line, thereby the function to execute concentrated physical-distribution processings is given its full play.

According to still another embodiment of the present invention, there are provided an excellent information apparatus and method, a network system, a recording medium, and a computer system for concentrated physical-distribution processings to enable, by accessing specified sites, the execution of all shipping instructions concerned with cargoes destined for physical distributors.

According to a further embodiment of the present invention, there are provided an information processing system and information processing method operating on a computer network, which can collect information from a plurality of clients and, after selectively determining optimum traders, distributing information among a plurality of different traders.

According to a yet further embodiment of the present invention, there are provided an excellent information apparatus and method, a network system, a recording medium, and a computer system, which, in communications (including 1 site vs. 1 site, 1 site vs. multi-site, and multi-site vs. multi-site) between a plurality of sites performed via a network, enables information obtained from one site to be distributed into another site seamlessly.

A first aspect of the present invention is an information processing apparatus or method, the information processing apparatus or method for processing a transmission message among a plurality of sites that are connected to one another via a network, characterized by comprising:

a message reception part or step receiving a message to thereby execute a prescribed piece of reception processing;

a rule accumulation part or step accumulating rules for executing pieces of message processing;

a message conversion part or step executing message conversion processing according to a corresponding one of the rules accumulated by the rule accumulation part; and a message transmission part or step executing a prescribed piece of transmission processing of the post-conversion message.

The information processing apparatus or method may further includes:

a part or step that in case no suitable rules exist in the rule accumulation part or step starts a relevant application to thereby execute message conversion processing.

Also, the information processing apparatus or method may be constructed in the way that the message is converted into a prescribed format according to the transmission origin of the message and/or the contents of the message.

Also, the information processing apparatus or method may be constructed in the way that the message conversion part or step specifies the message transmission destination according to the transmission origin of the message and/or the contents of the message.

Also, the information processing apparatus or method may be constructed in the way that the message conversion part or step may perform automatic protocol conversion in correspondence with the message transmission destination that has been specified according to the transmission origin of the message and/or the contents of the message.

Also, the information processing apparatus or method may be constructed in the way that the message conversion part or step may execute encryption processing in correspondence with the message transmission destination that has been specified according to the transmission origin of the message and/or the contents of the message.

The information processing apparatus or method according to the first aspect of the present invention can be utilized for concentrated management of the physical processings that are comprised of drafting of shipping plans between each of various kinds of trader sites and corresponding each of its clients sites, the both being connected to each other via a network, selection decision on traders concerned with various businesses associated with the shipment/physical distributions and etc.

In this case, each of various kinds of trader sites or each of its clients sites can at all times designate as the transmission destination a prescribed server that has realized the first aspect of the present invention and can thereby transfer to this server the message concerned with the making, or the receipt, of the orders for things or services. On this server, a message transmission destination is automatically determined according to the transmission origin and the analyzed results of the contents of the message. Therefore, the transmission origin of the message can make or receive an order for things or services without consciousness of its opponents.

Also, according to the information processing apparatus or method according to the first aspect of the present invention, transmission data is format-converted according to the automatically determined message transmission destination. Therefore, the message transmission origin can make data transmission without consciousness of the data format on the reception side. Also, since automatic protocol conversion is performed according to the reception side, the message transmission origin can perform data transmission without consciousness of the form of communication on the reception side. Also, since transmission data is encrypted in accordance with the encryption system corresponding to the reception side, the message transmission origin can perform data transmission without consciousness of the encryption system on the reception side Also, a second aspect of the present invention is an information processing apparatus or method, the information processing apparatus or method for processing a transmission message among a plurality of sites that are connected to one another via a network, which is characterized by comprising:

a message broker or message broking step that commits to an application processing of data that becomes necessary when message conversion is performed between the sites;

a message translator or message translating step that in response to the arrival of the field serving as a trigger in a message format performs mutual exchange between the message formats according to a prescribed conditional sentence;

a message router or message routing step that according to a prescribed piece of identification information contained in a message adds a destination address to the message;

a B2B connector or B2B connecting step that provides a message exchange interface between the system and a site outside the system; and a gateway or mutual connection step that provides a message exchange interface between the system and a local site inside the system.

The information processing apparatus and method according to the second aspect of the present invention can be utilized for concentrated management of the physical processings that are comprised of drafting of shipping plans between each of various kinds of trader sites and corresponding each of its clients sites, the both being connected to one another via a network, selection decision on traders concerned with various businesses associated with the shipment/physical distributions.

In this case, each of various kinds of trader sites or each of its clients sites can at all times designate as the transmission destination a prescribed server that has realized the second aspect of the present invention and can thereby transfer to this server the message concerned with the making, or the receipt, of the orders for things or services. On this server, a message transmission destination is automatically determined according to the transmission origin and the analyzed results of the contents of the message. Therefore, the transmission origin of the message can make or receive an order for things or services without consciousness of its opponents.

Also, a third aspect of the present invention is a network system including a plurality of sites which are connected to one another via a communication network, wherein message exchange between arbitrary sites are controlled by a prescribed server, characterized by, as its interior processing parts on said prescribed server, comprising:

a message reception part that receives a message to thereby execute a prescribed piece of reception processing;

a rule accumulation part that accumulates rules for executing pieces of message processing;

a message conversion part that according to a corresponding one of the rules accumulated by the rule accumulation part executes message conversion processing; and a message transmission part that executes a prescribed piece of transmission processing of the post-conversion message.

Provided, however, that the "system" so referred to here represents a thing made up of a plurality of logically aggregated devices (or functional modules each for realizing a prescribed function) and has no relevancy to whether or not each device or module is existent within a single housing.

The network system according to the third aspect of the present invention can be utilized for concentrated management of the physical processings that are comprised of drafting of shipping plans between each of various kinds of trader sites and corresponding each of its clients sites, the both being connected to one another via a network, selection decision on traders concerned with various businesses associated with the shipment/physical distributions between said both, etc.

In this case, each of various kinds of trader sites or each of its clients sites can at all times designate as the transmission destination a prescribed server that has realized the third aspect of the present invention and can thereby transfer to this server the message concerned with the making, or the receipt, of the orders for things or services. On this server, a message transmission destination is automatically determined according to the transmission origin and the analyzed results of the contents of the message. Therefore, the transmission origin of the message can make or receive an order for things or services without consciousness of its opponents.

Also, according to the server function that has realized the third aspect of the present invention, transmission data is format-converted according to the automatically determined message transmission destination. Therefore, the message transmission origin can make data transmission without consciousness of the data format on the reception side. Also, since automatic protocol conversion is performed according to the reception side, the message transmission origin can perform data transmission without consciousness of the form of communication on the reception side. Also, since transmission data is encrypted in accordance with the encryption system corresponding to the reception side, the message transmission origin can perform data transmission without consciousness of the encryption system on the reception side.

Also, a fourth aspect of the present invention is a network system, the network system including a plurality of sites each two of that are connected to one another via a communication network, whereby there is managed by a prescribed server message exchange between given two sites, characterized by, as its interior processing parts on said prescribed server, comprising:

a message broker that commits to an application on the server processing of data that becomes necessary when message exchange is performed between the sites;

a message translator that in response to the arrival of the field serving as a trigger in a message format performs mutual conversion between the message formats according to a prescribed conditional sentence;

a message router that according to a prescribed piece of identification information contained in the message adds a destination address to the message;

a B2B connector that provides a message exchange interface between the system and a site outside the system; and a gateway that provides a message exchange interface between the system and a local site inside the system.

The network system according to the fourth aspect of the present invention can be utilized for concentrated management of the physical processings that are comprised of drafting of shipping plans between each of various kinds of trader sites and corresponding each of its clients sites, the both being connected to one another via a network, selection decision on traders concerned with various businesses associated with the shipment/physical distributions.

In this case, each of various kinds of trader sites or each of its clients sites can at all times designate as the transmission destination a prescribed server that has realized the fourth aspect of the present invention and can thereby transfer to this server the message concerned with the making, or the receipt, of the orders for things or services. On this server, a message transmission destination is automatically determined according to the transmission origin and the analyzed results of the contents of the message. Therefore, the transmission origin of the message can make or receive an order for things or services without consciousness of its opponents.

Also, a fifth aspect of the present invention is a recording medium having physically stored in a computer-readable form computer software that has been described so that the processing of a transmission message between two or more of network-connected sites may be executed on a computer system, the computer software being characterized by comprising:

a message reception step that receives a message to thereby execute a prescribed piece of reception processing;

a rule accumulation step that accumulates rules for executing the message processing;

a message conversion step that according to a corresponding one of the rules accumulated by the rule accumulation step executes message conversion processing; and a message transmission step that executes a prescribed piece of transmission processing of the post-conversion message.

The recording medium according to the fifth aspect of the present invention is one that provides computer software in a computer-readable form to, for example, a generalized computer system capable of various kinds of computer software pieces. This type of recording media is a type of detachable and portable recording media such as a CD (Compact Disc), an FD (Floppy Disc), an MO (Magneto-Optical disc), etc.

Such a recording medium is one that defines the structural or functional co-operative relationship between computer software and the recording medium, which is for the purpose of realizing the function of a prescribed piece of computer software on the computer system. In other words, by installing a prescribed piece of computer software into the computer system via a program recording medium according to the fifth aspect of the present invention, on the computer system the co-operative action occurs, whereby it is possible to obtain the same function and effect as those attainable with the information processing apparatus and information processing method according to the first aspect of the present invention.

Also, a sixth aspect of the present invention is a computer program described in a computer-readable form so that the processing of a transmission message between two or more network-connected sites may be executed on a computer system, characterized by comprising:

a message reception routine that receives a message to thereby execute a prescribed piece of reception processing;

a rule accumulation routine that accumulates rules for executing the message processing;

a message conversion routine that according to a corresponding one of the rules accumulated by the rule accumulation step executes message conversion processing; and a message transmission routine that executes a prescribed piece of transmission processing of the post-conversion message.

The computer program according to the sixth aspect of the present invention is, for example, a type that has described in a computer-readable form the processing operation of a generalized computer system capable of executing various kinds of program codes. This type of computer programs can be moved between the systems with the use of a detachable and portable recording medium such as a CD (Compact Disc), an FD (Floppy Disc), an MO (Magneto-Optical disc), etc., or can be installed into a specified system. In addition, by way of a transmission medium such as a network (that is regardless of whether it is a wire network or wireless network), it is also technically possible to provide a computer program to a specified computer system.

Installing into a prescribed computer system a computer program that is concerned with the sixth aspect of the present invention makes it possible for a co-operative action to occur on this computer system and to obtain the same function and effect as those attainable with the information processing apparatus and information processing method according to the first aspect of the present invention.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 10 consists of FIGS. 10A and 10B, FIG. 10A showing a diagram schematically illustrating the business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is executed when the local site 50 makes delivery order (D/O) and shipment instruction with respect to the business client 60, and FIG. 10B showing an explanation of acronyms in FIG. 10A;

FIG. 12 consists of FIGS. 12A and 12B, FIG. 12A showing a diagram schematically illustrating the business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is executed when the business client 60 makes actual results presentation/claim (sales trigger) to the local site 50, and FIG. 12A showing an explanation of acronyms in FIG. 12A;

FIG. 13 consists of FIGS. 13A and 13B, FIG. 13A showing a diagram schematically illustrating the business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is executed when the local site 50 makes management of the cargo location, and FIG. 13B showing an explanation of acronyms in FIG. 13A.

DESCRIPTION OF THE PREFERRED
EMBODIMENTS

Figure 1:
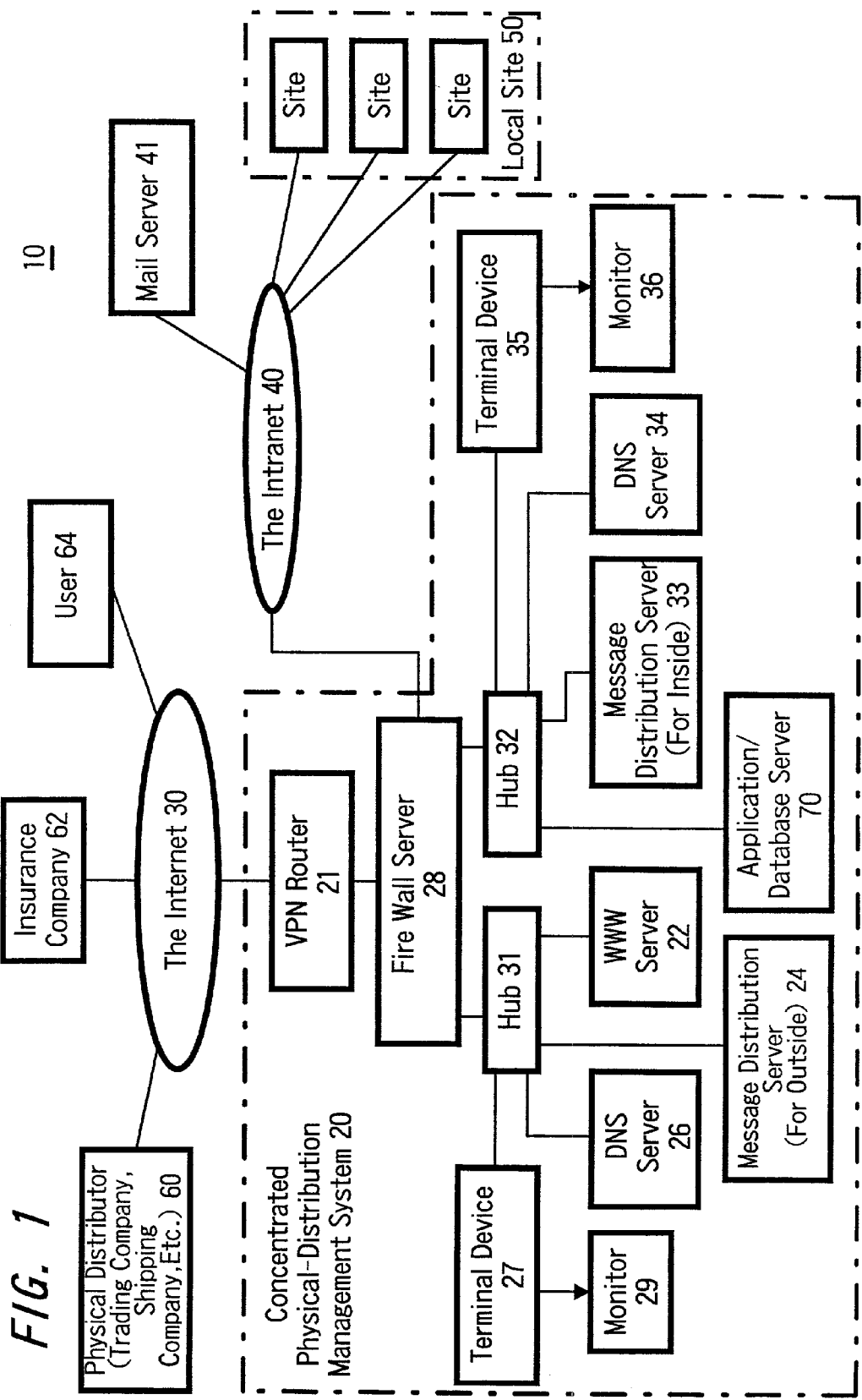
FIG. 1 is a diagram schematically illustrating the conceptual construction of a general physical-distribution management system 10 that is used as an embodiment of the present invention.

FIG. 1 typically illustrates a conceptual construction of a general physical-distribution management system 10 in an embodiment of the present invention. In the general physical-distribution management system 10, a concentrated physical-distribution management system 20 is capable of being connected to the Internet (or another wide-area network) serving as a communication network line, the concentrated physical-distribution management system 20 being constructed such that one or more local sites 50 is or are further connected thereto via an internal network 40 such as the intranet.

The concentrated physical-distribution management system 20 functions as a portal site with respect to the local sites 50 on the intranet 30 or to each of various trader sites on the internet 40. The concentrated physical-distribution management system 20 plays the principal role in embodying the present invention.

The local site 50 is a terminal or computer for this general physical-distribution management system 10. For example, when this client is an electric maker that manufactures and sells electronic devices, etc., the group factories or physical-distribution places that are located inside or outside our country (i.e. Japan, the United States, European countries, etc.) each correspond to this local site 50. The concentrated physical-distribution management system 20 according to this embodiment plays the role as a generalized center with respect to these local sites 50. Of course, needless to say, such local site 50 can be configured not only as the site falling within the same group but also as a site that is outside the relevant group and that is generally made open.

The Internet 30 is a gigantic network that has been built up in accordance with TCP/IP (Transmission Control Protocol/Internet Protocol). On the Internet 30 there scatteringly exist information resources, each having been described according to, for example, HTML (Hyper Text Transfer Protocol) format. On the TCP/IP network each piece of information resource is identified using a resource identifier that is described with URL (Uniform Resource Locator) format. As a system for searching for the HTML format information resource, over a wide area, on the TCP/IP network there is known a WWW (World Wide Web) piece of software, through the use of that the HTML information resource can be accessed with the reference information on URL and according to an HTTP (Hyper Text Transfer Protocol) protocol procedure.

In this embodiment, with respect to the Internet 30, a plurality of sites are further installed for the purpose of performing businesses, i.e. job transactions concerned with goods or services between the concentrated physical-distribution management system 20 and each of said sites. In the example of FIG. 1, beginning with a site 60 run by various kinds of physical distributions such as a trading company, transportation company, a shipping company, etc., a site 62 run by insurance companies and their agencies, and further, communication terminal devices 64 for end users can be connected to the Internet 30.

The concentrated physical-distribution management system 20 is incorporated with a fundamental system that works as a Web site that can realize a communication with other computer systems by way of the internet 30. For this reason, the concentrated physical distribution management system 200 is provided with a VPN (Virtual Private Network) router, to which a fire wall server 28 is connected via this VPN router 21.

To the fire wall server 28 there are connected via a first hub (HUB) 31 a WWW server 22, a for-outside message distribution server 24, a DNS server (Domain Name System) 26, etc. In addition, to that fire wall server 28 there are also connected a terminal device 27 provided with a personal computer (PC), etc. and a display monitor 29. To the fire wall server 28 there is further connected a second hub 32. To this second hub 32 there are connected a DNS server 34 and a message distribution server 33 that is used for inside. In addition, there are connected a terminal device 35 provided with a personal computer (PC), etc. and its monitor 36. Further, to this second hub 32 there are connected an application and a server 70 for use as a database as will be described later. And to this fire wall server 28 there are connected via a communication network line 40 local sites 50 and a mail (Mail) server 41.

The terminal devices 27 and 35 each are a device that inputs data from outside or that searches information via the portal site side, the Internet 30, or the Intranet 40. The searched results and the like are displayed on the screens of the respective monitors 29, 36.

As the above-described fire wall server 28 there can be used the one that has been constructed as an application gateway. Fire wall software is incorporated in the application gateway.

Regarding the function of the fire wall server 28, it has incorporated therein an original function as a fire wall that is intended for preventing an unjust access from outside the system 20 by utilizing a prescribed authentication mechanism. In addition, it also can have incorporated therein the function as a proxy server (Proxy Server) (well known). Further, it also has loaded therein an LDAP (LDAP) (Lightweight Directory Access Protocol) that is used as a protocol for having access to a directory-managing database. To this LDAP there is added a security function that is what is called the well known "SSL (Secure Sockets Layer)".

Within the internal network connected to the fire wall server 28 there is installed the above-described application/database server (hereinafter referred to simply as "the database server") 70 that constitutes the kernel or core of the concentrated physical-distribution system 20.

The database server 70 executes pieces of processing (such as cargo shipping instruction processing) necessary for the physical distribution system and also functions as a server for use for an application. Accordingly, from this database server 70 there are executed the accident insurance processings regarding the transport of cargoes, are calculated physical distribution costs needed for the delivery of cargoes, etc., or are executed processings of, for example, distributing those items of information to the clients via the Internet 30.

As the connection form wherein the WWW server 22, etc. has access to the above-described database server 70, it is possible to utilize the TCP/IP protocol. According to the results of the database server 70, a screen display is produced which is destined for transmission to the accessing side. This screen display is transmitted to the requesting origin in accordance with the HTTP form.

Here, as the delivering form of cargoes there are a wide variety of delivering forms, which include delivery only by land, delivery that includes a delivery by sea that uses cargo ships, etc., or further a delivery that uses a plane exclusively used for cargoes. In the embodiment of the present invention that follows, for brevity of explanation, the explanation will be made based on the premise that delivery is made as the delivery that partly includes cargo export by sea. Accordingly, in the above-described database server 70, the following processings are executed.

(1) Preparation Processing for Delivery Schedules, Requests for Cargoes, Requests for Carrier-Car Schedules, etc. with Respect to the Shipment Instruction Information from the Cargo Client Side (The Shipment Instruction Information Processing Function Part)

According to this shipment instruction information physical distributors (such as a delivery trader, an exporter, a shipping company, etc.) are designated. Also, necessary papers are produced, which include a drafting of the bill of lading (B/L), or a drafting of the insurance policy (a letter of application), that is produced using information exchanged between the client and the shipping company.

(2) Estimation Calculation, Claim, and Management of the Physical Distribution Expenses Based on the Shipment Instruction Information Electronic settlement processing is executed, which includes estimating physical distribution costs, transmitting the estimated results to the cargo client side, claiming physical distribution costs to the cargo client origin, and paying physical distribution costs to the physical distributors. And management is performed of the claim and payment of the physical distribution costs.

(3) Production Processing for Cargo Trucking Information, Based on the Use of Information from Physical Distributors.

When a shipping instruction is made, the cargoes that have been instructed to be delivered are delivered by way of respective physical distributors. With this processing, management is performed of trucking information on in what place those cargoes are being presently conveyed, in other words the time and data for domestic shipment and domestic arrival, the time and data for foreign shipment and foreign arrival made by delivery, etc.

(4) Cargo Management Processing

Management is performed of actual things until the cargoes finally reach an end user, i.e. client. For this purpose, there utilized inventory information and cargo trucking information, by the use of which there can be grasped whose cargoes (owner) they are, what cargoes (products or parts) they are, and how many cargoes (quantity) there are, where (in which places) they are being kept in custody.

Through making use of those information processings on the database server 70, on the electronic general physical-distribution management system 10 there is simplified ordering of cargoes as well as receipt of an order. Further, draft information comprised of a plurality of the items constituting the sources of a bill of lading.

Figure 2:
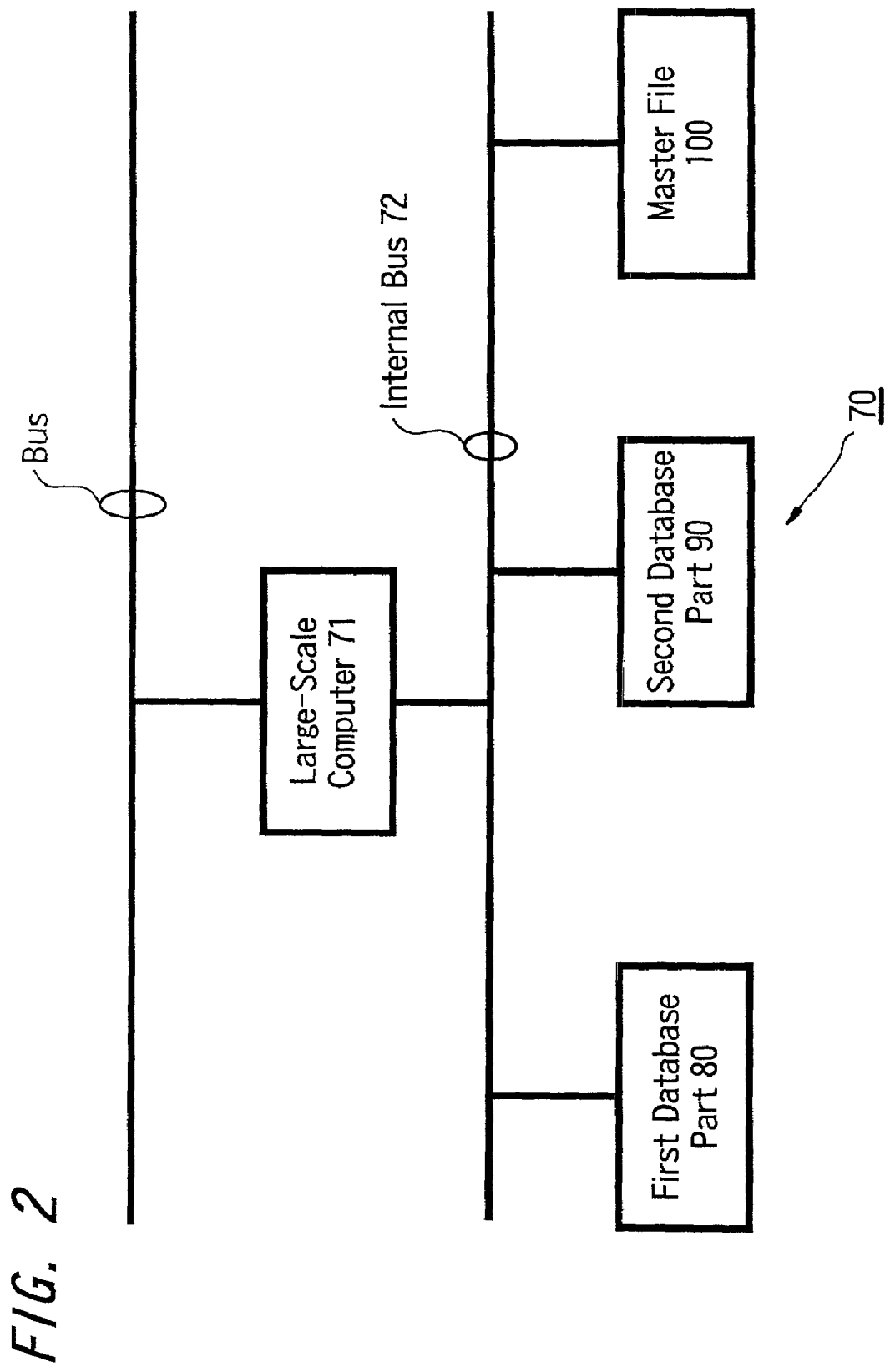
FIG. 2 is a diagram schematically illustrating the construction of a database server 70

In order to execute the above-described pieces of processing, as illustrated in FIG. 2, the database server 70 has installed thereon a large-scale computer 71 for use as management of the database. Besides, in order to realize the above-described processings (1) to (4), a plurality of portal (Web portals) are prepared, and a first database part 80 that corresponds to these Web portals is connected via a hub to an internal hub 72. Further, in the internal bus 72, there are connected a second database part 90 that stores records for shipment of cargoes, payment of physical-distribution costs, etc. and a master file 100 that has accumulated therein information that is needed to calculate necessary expenses such as physical-distribution cost or insurance premium.

Figures 3, 3A:
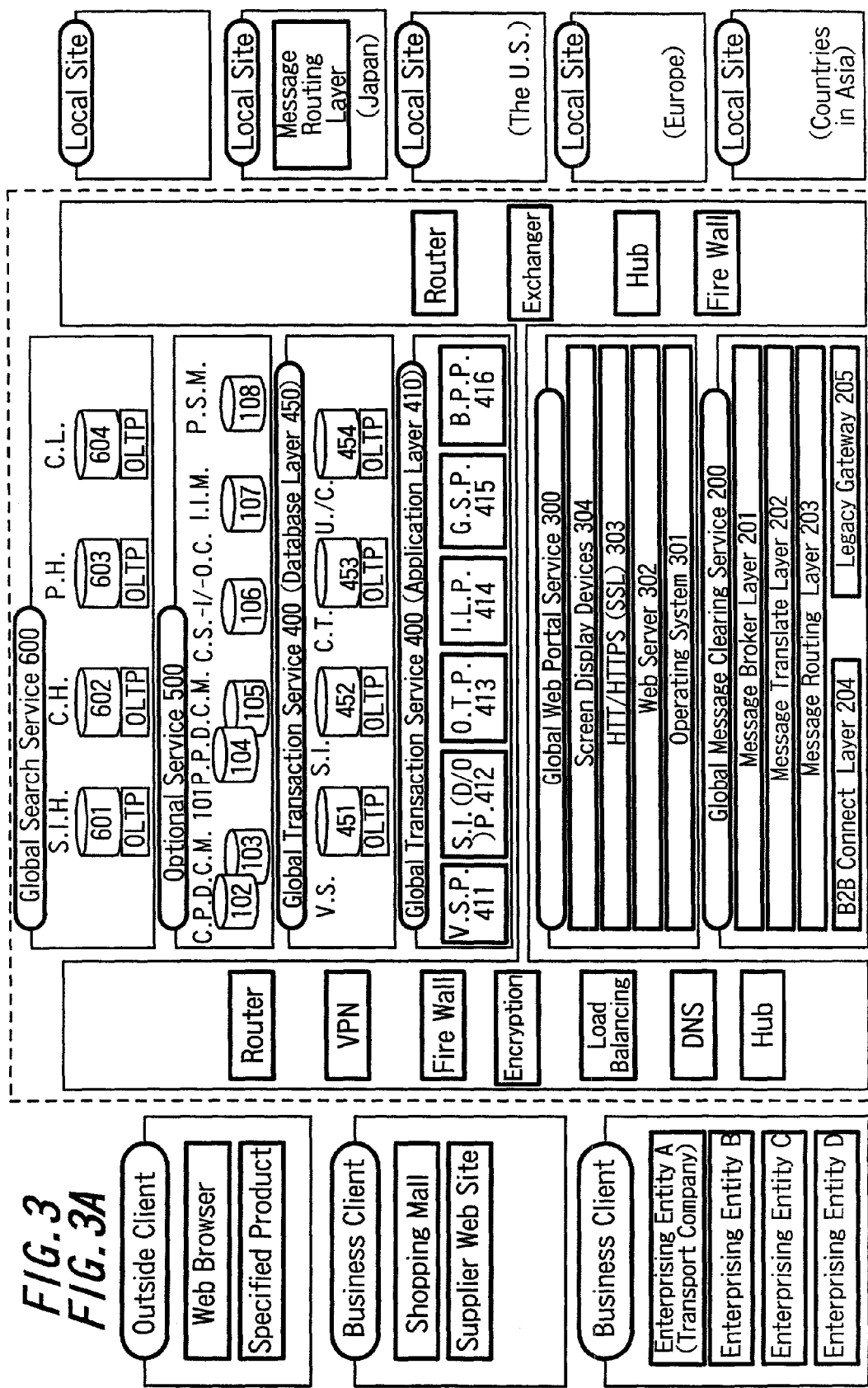
FIG. 3 consists of FIGS. 3A and 3B, FIG. 3A showing a diagram illustrating the system construction of a concentrated physical-distribution management system 20, and FIG. 3B showing an explanation of acronyms in FIG. 3A.

FIG. 3A illustrates the system construction of the concentrated physical-distribution management system 20. As illustrated in this figure, the concentrated physical-distribution management system 20 is constructed of the followings. A global message clearing service 200 that controls the message exchange between each of the local sites inside the general physical-distribution management system 10 and each of the outside clients (business clients, etc.). A global Web portal service 300 that is for providing an operation environment for a portal site regarding the management of the physical distributions. A global search service 600 that performs database management of various kinds of history information items concerning the physical distribution. And optional service 500 that performs data exchange a lower-order layer global message clearing service 100 and an upper-order global search service 500 (or an optional service 500), namely that realizes the transaction processings between said two layers.

The global Web portal service 300 is a functional module for providing, on a Web basis, information resources the concentrated physical-distribution management system 20 accumulates. As illustrated, it is constructed of respective hierarchical software combinations of a prescribed operating system 301, Web server 302, HTTP/HTTPS, (SSL) 303, and screen display appliances 304. Within the operation environment the global Web portal service 300 provides it is possible to configure a Web portal site.

The global transaction service 400 performs is constructed of an application layer 410 and a database layer 450. It performs data exchange, i.e. transaction processing between the lower-order layer global message clearing service 100 and the upper-order layer global search service 500 (or optional service 500).

The application layer 410 of the global transaction service 400, as illustrated, prepares at least the following six services. Each service can function as the following portals that operate on the global Web portal service 300.

(a) A vessel schedule portal 411 for being accessed when inputting/outputting a departure timetable (vessel schedule).

(b) A shipment instruction portal 412 for being accessed when inputting/outputting shipment instruction information.

(c) An order trucking portal 413 for being accessed when inputting/outputting cargo trucking information.

(d) An inventory location portal 414 when inputting/outputting cargo location information.

(e) A search portal 415 for being accessed when inputting/outputting generalized information such as physical-distribution costs.

(f) A bill payment portal 416 for being accessed when inputting/outputting information regarding the payments of various kinds of bills concerned with physical distributions.

Each of these portals 411 to 416 operates in the environment that is constructed of combined hierarchical pieces of software (none of them is illustrated), the hierarchical structure of that having a prescribed operating system, Web application server, local balancing system, logical application processing, ACL management, etc.

Also, the database layer 450 of the global transaction service 400 has prepared therefor at least the following databases in correspondence with the above-described Web portals 411 to 416. The database layer 450 is configured by the first database part 70 in the interior of the illustration of FIG. 2. However, according to the embodiment of the present invention, the database shown below and the above-described Web portals don't coincide with one another.

(a) A database 451 that has accumulated therein vessel schedules.

(b) A database 452 that has accumulated therein shipment instruction information and bill-of-lading information.

(c) A database 453 that has accumulated therein cargo trucking information.

(d) An ID database 454 having accumulated therein names, IDs, etc. of cargo clients, physical distributors (user/carrier), etc.

These databases 451 to 454 can have a form of processing wherein through an OLTP (On-line Transaction Processing), i.e. on-line transaction processing a series of database accesses are performed according to the messages from a plurality of terminals connected on-line and the processed results are promptly sent back to the terminals.

The global search service 600 is a functional module for performing database management of various kinds of history information items concerning physical distributions. It has prepared therefor a database 601 that manages the histories of shipment instructions, a database 602 that manages claim histories, a database 603 that manages payment histories, and a database 604 that manages cargo locations. The global search service 600 is made up of the second database part 90 illustrated in FIG. 2. These databases 601 to 604 can perform direct search and totaling of the database through an OLAP (On-line Analytical Processing), i.e. on-line analytical processing.

The optional service 500 is a functional module for performing database management of other information items that would fall under the category of an "option", and is constructed as the master file 100 illustrated in FIG. 2. As the master file 100 there is a master file 101 concerning physical-distribution cost affairs. The master file 100 further is more finely divided into physical-distribution costs claimed and their management 102, 103, physical-distribution costs paid and their management, etc. Other than these files, there is a database-converted master file 106 for performing management of in-storage/shipment of cargoes with respect to warehouse. Similarly, there are also included database 107 regarding the against-loss insurance, a database 108 for settlement of the prices, etc.

In order to make information have access to the above-described applications and databases as well as to transmit or receive information via the communication network lines 30 and 40, the concentrated physical-distribution management system 20 has disposed therein the global message clearing service (GMCS: Global Message Clearing Service) 200. This global message clearing service 200 has prepared therein a communication protocol stack for making automatic selection of the protocol of the received data. Therefore, the service 200 can provide an integrated service with respect to the message exchange that occurs within the general physical-distribution management system 10. The global message clearing service 200 plays the core role of the present invention.

The global message clearing service 200 is equipped with, for example, the following that uses an EDI (Electronic Data Interchange) that performs data conversion in conformity with the protocol of the received data. A by-Internet commercial transaction system, especially EDIFACT (Electronic Data Interchange for administration, commerce, and transport) that is an international standard used when performing on-line the business such as making/receipt of orders or settlement therefor. A file transfer protocol (FTP: File Transfer Protocol). A page description language XML (Extensible Makeup Language) used as a substitution for the EDIFACT. And so forth. Accordingly, the above-described database server 70 functions also as an EDIFACT server for use on the electronic commercial transactions, which is necessary for mutual communication that is made through the intermediary of the communication networks 30, 40.

The global message clearing service 200 according to this embodiment has, above all, a feature in that it can provide a function to support a client in selectively determining an optimum trader when this client makes or receive orders for things or services. Through the utilization of the function of the global message clearing service 200, the concentrated physical-distribution management system 20 gathers information items from a plurality of clients through the use of the computer networks based on the communication lines 30, 40 to thereby select an optimum trader. The system 20 can thereby perform its service of distributing information to a plurality of different traders. Also, by performing information cooperation a plurality of times between the client and the relevant trader, finally it becomes possible to provide this service.

In the global message clearing service 200, when receiving transmission data addressed to the trader from the client, the service 200 refers to the contents of the received data and also refers the value to a reference table. It thereby can determine a piece of processing to be started (i.e. a relevant application). Also, the global message clearing service 200 receives transmission data addressed from the client to the trader and refers to the reference table with respect to the contents of the data thereof. It thereby selects the data transmission destination, i.e. selects the relevant trader. Simultaneously, it determines the transmission method, data encryption method, data format, etc. on the communication line such as the Internet 30 while, on the other hand, it can divide or verify the data in unit of the relevant conditions.

When the global message clearing service 200 provides the above-described information access service, it becomes possible for the client to perform transmission/reception of data, i.e. transaction information between itself and the concentrated physical-distribution management system 20 serving as a single portal site. Consequently, the client can realize the business-to-business (B2B) data communication with a plurality of business partners, i.e. transaction destination traders.

According to this service, since the information cooperation destinations are managed in a more unified way independently of the transaction partners, both the client and the trader can reduce the costs that follow the issuance or receipt of orders. By the global message clearing service 200 intervening between the partners making information cooperation, the transmission side client, with almost no consciousness of the state of the reception side, or the reception side trader, with almost no consciousness of the state of the transmission side, can perform the transmission/reception of the message for issuance or receipt of the thing or services (goods, products, etc.)

Further, the global message clearing service 200 can keep the codes in the transaction data in custody and perform self-learning of them and can thereby select a trader at the transmission destination without ex ante registration of the master file.

Also, through the intervention of the global message clearing service 200, it is possible to realize asynchronous communication when performing a 1-site vs. multi-site communication.

As illustrated in FIG. 3A, the global message clearing service 200 according to this embodiment constitutes a communication protocol stack through the combined use of a message broker (Message Broker) 201, a message translator (Message Translator) 202, a message router (Message Router) 203, a B2B (Business to Business) connect layer (B2B connect layer) 204, and a legacy gateway (Gateway for Legacy) 205.

The message broker 201 is a functional module through the intermediary of that connection is made with the upper-order application/database. The principal processing of the message broker 201 extracts data that is necessary when executing the data exchange processing between the trader site (business client) such as the physical distributor site 60 or insurance trader site 62 and the local site 50, via the global message clearing service 200, and then transmits that to the application/database server 70. Also, conversely, the message broker 201 is arranged to transmit to the message translator 202 the message that has been sent on from the upper-order application/database.

The message translator 202 is a functional module that performs mutual conversion between each two of various kinds of message formats. As corresponding protocols there are message formats such as an UN/EDIFACT (United Nations Directories for Electronic Data Interchange for Administration, Commerce, and Transport), an ANSI (American National Standards Institute) X. 12, an XML (Extensible Makeup Language), a Flatfile, or IDoc (Intermediate Document). When there is an arrival of the field, serving as a trigger, in the message format, the message translator 202 performs message processing in response to the trigger in conformity with the conditional sentences.

The message router 203 is a functional module that performs message routing by the use of an inbound mail box and outbound mail box. In this embodiment, it has a function to add, using the message ID as the key, a destination address to the message from the transaction destination table. In the transaction destination table, in case one piece of record has a plurality of transaction destination, the message router 203 decomposes that record. Also, it makes up into one item of record the data received from a plurality of transaction destinations and transmits it to the opponent partner destination. In addition, it automatically updates the routing table according to the transaction items.

The B2B connect layer 204 is a functional module that performs an interface connected with an outside system such as a 3PL (3rd Party Logistics), using interface applications such as an FTP (File Transfer Protocol), an SMTP (Simple Mail Transfer Protocol), or a Web EDI (Web Electronic Data Interchange).

The legacy gateway 205 is a functional module that executes message transmission/reception processing in the interior of the system such as a local site. The legacy gateway 205 executes message transmission/reception between each local site within a particular entrepreneur that has been connected via the Intranet 40 and the global message clearing service 200.

Figure 4:
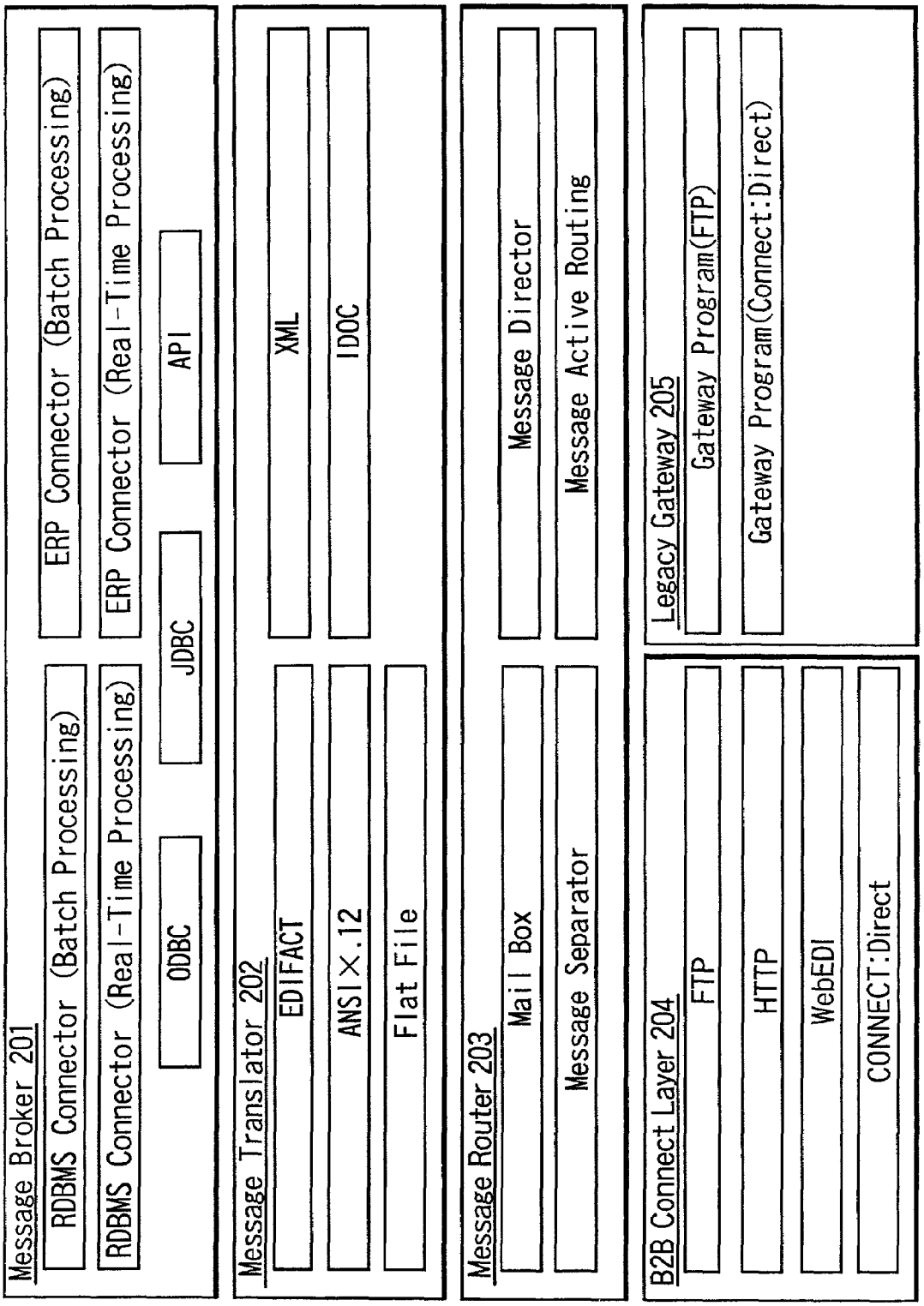
FIG. 4 is a diagram illustrating a schematic component construction of a global message clearing service 200.

FIG. 4 illustrates a schematic component construction of the global message clearing service 200 according to this embodiment.

The message broker 201 is provided with an RDBMS connector (batch processing), an RDBMS connector (real-time processing), an ERP connector (batch processing), and an ERP connector (real-time processing). The RDBMS connector (batch processing) performs data exchange between the global message clearing service 200 and the RDBMS (Relational Database Management System) with a batch form while the RDBMS (real-time processing) performs data exchange between the clearing service part 110 and the RDBMS with a real-time form Also, the ERP connector (batch processing) performs data exchange between the global message clearing service 200 and the ERP (Enterprise Resource Planning) with a batch form while the ERP connector (real-time processing) performs data exchange between the clearing service part 110 and the ERP.

The message translator 202 comprises the EDIFACT, ANSI X. 12, Flatfile, XML, IDoc, and flat file. The EDIFACT is a functional module that converts into the EDIFACT format the data the global message clearing service 200 has received. The ANS X. 12 is a functional module that converts into the ANSSI X. 12 format the data the global message clearing service 200 has received. The Flatfile is a functional module that converts into the FlatFile format the data the global message clearing service 200 has received. The XML is a functional module that converts into the XML format the data the global message clearing service 200 has received. The IDoc is a functional module that converts into the IDoc format the data that the global message clearing service 200 has received.

The message router 203 is provided with a mail box, a message separator, and a message director. The mail box is a functional module that stores therein at a region determined in units of a transmission destination the message the transmission destination of that has been determined and, according to the request, performs transmission/reception of the data. The message separator is a functional module that converts a message stack containing therein a plurality of transmission destinations into a plurality of messages summarized in units of a single transmission destination. The message director is a functional module that determines the transmission destination of the message according to the contents of the message.

The B2B connect layer 204 is provided with an FTP, an HTTP, a WebEDI, and a CONNECT: DIRECT. It performs data exchange between itself and each of various kinds of outside trader sites that have been connected via the communication line 30 such as the Internet. The FTP is a functional module that performs data exchange between itself and the trader site on an HTTP base. The Web EDI is a functional module that performs data exchange between itself and the trader site in accordance with its specific protocol through which browser software can be utilized. The CONNECT: DIRECT is a functional module that performs data exchange between itself and the trader site in accordance with the CONNECT: Direct program.

The legacy gateway 205 is provided with a gateway program (FTP) and a gateway program (CONNECT: Direct). It performs data exchange between itself and each of the local sites inside a particular entrepreneur that is connected with it by way of the communication line 40 such as the Intranet. The gateway program (FTP) is a functional module that performs data exchange between itself and each local site on an FTP base. The gateway program (CONNECT: Direct) is a functional module that performs data exchange between itself and each local site on a CONNECT: DIRECT base.

Figures 5, 5A:
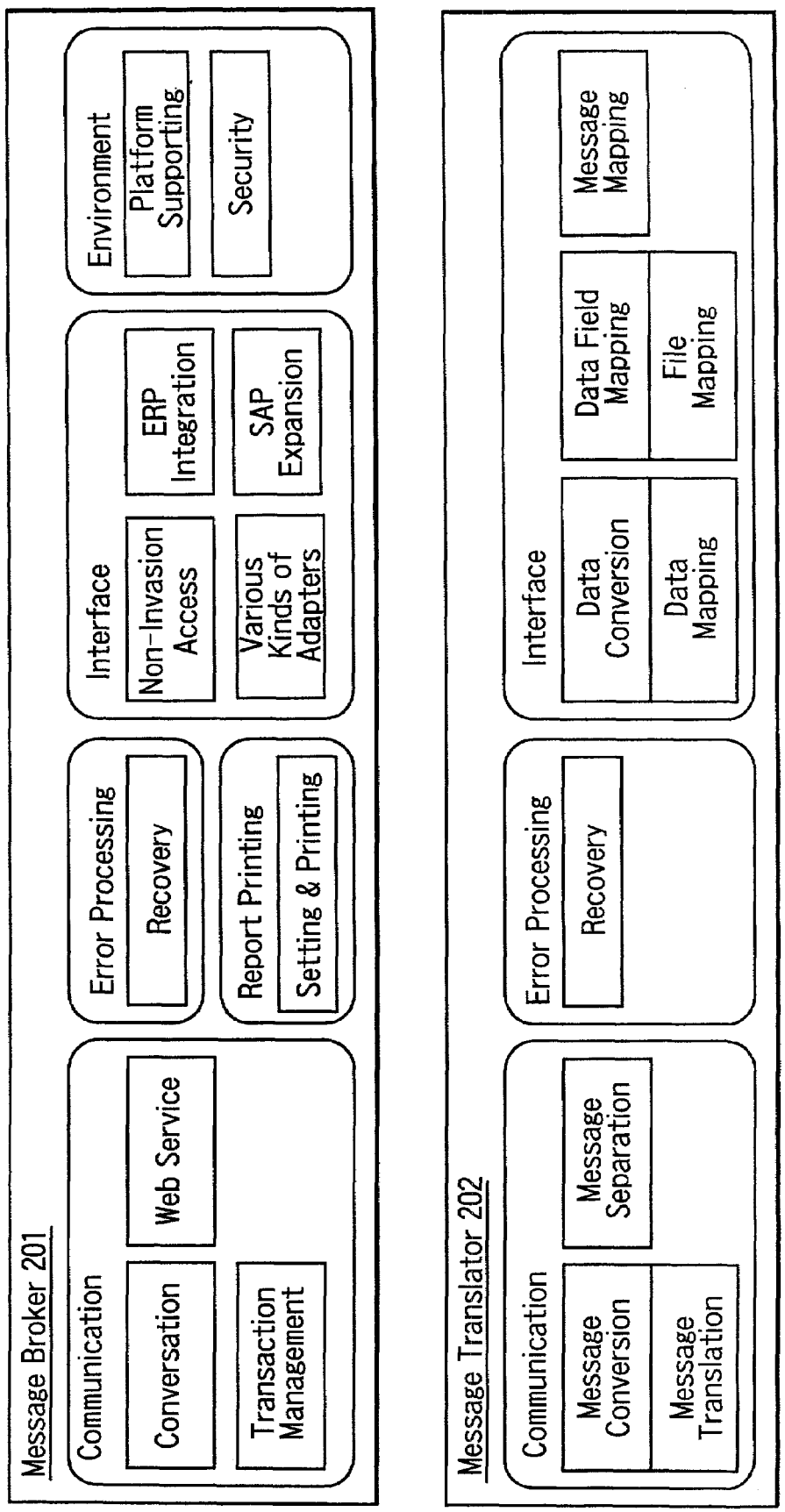
FIG. 5 consists of FIG. 5A, 5B, 5C which as a whole are a diagram illustrating an architecture model construction of the global message clearing service 200.
Figure 5B:
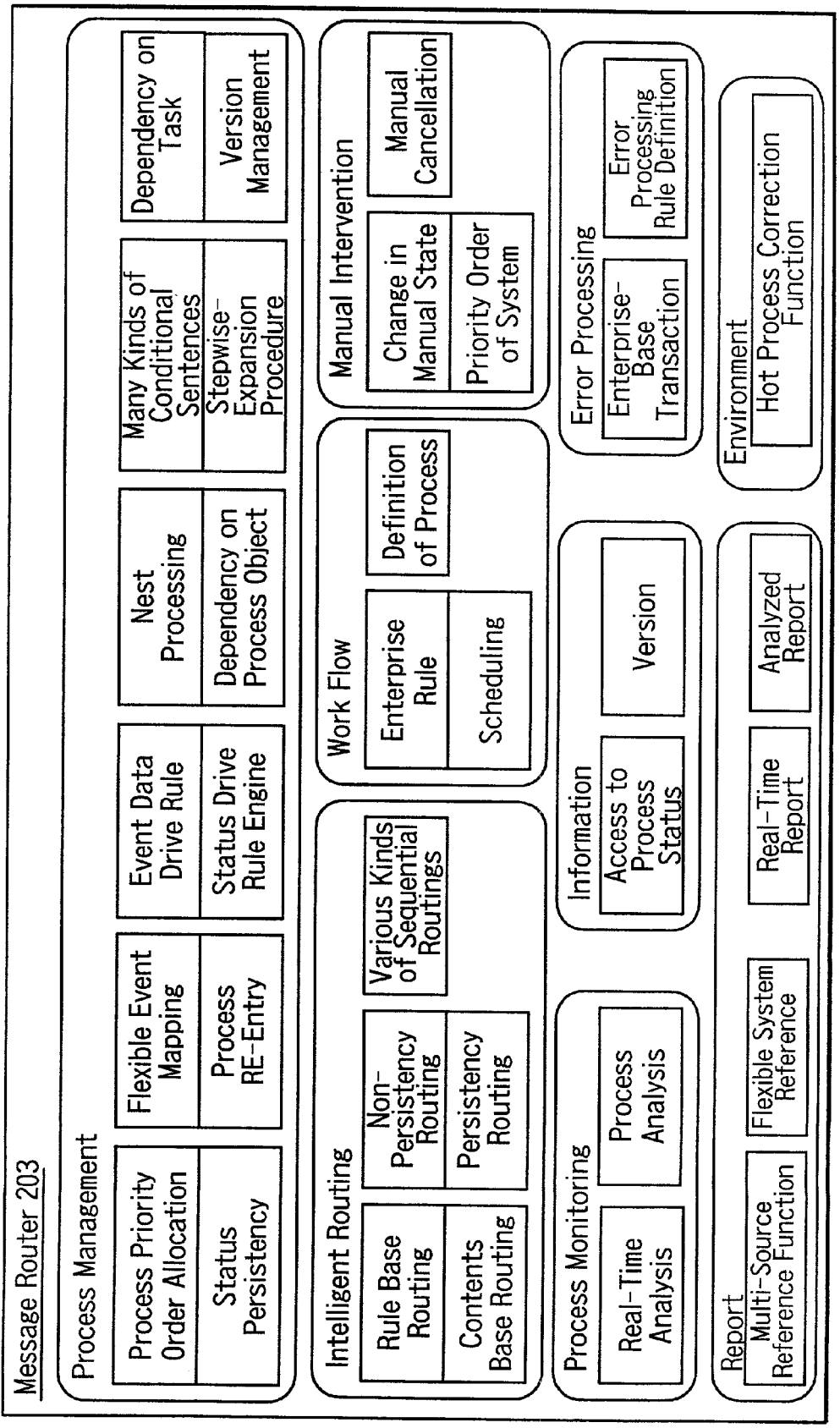
Figure 5C:
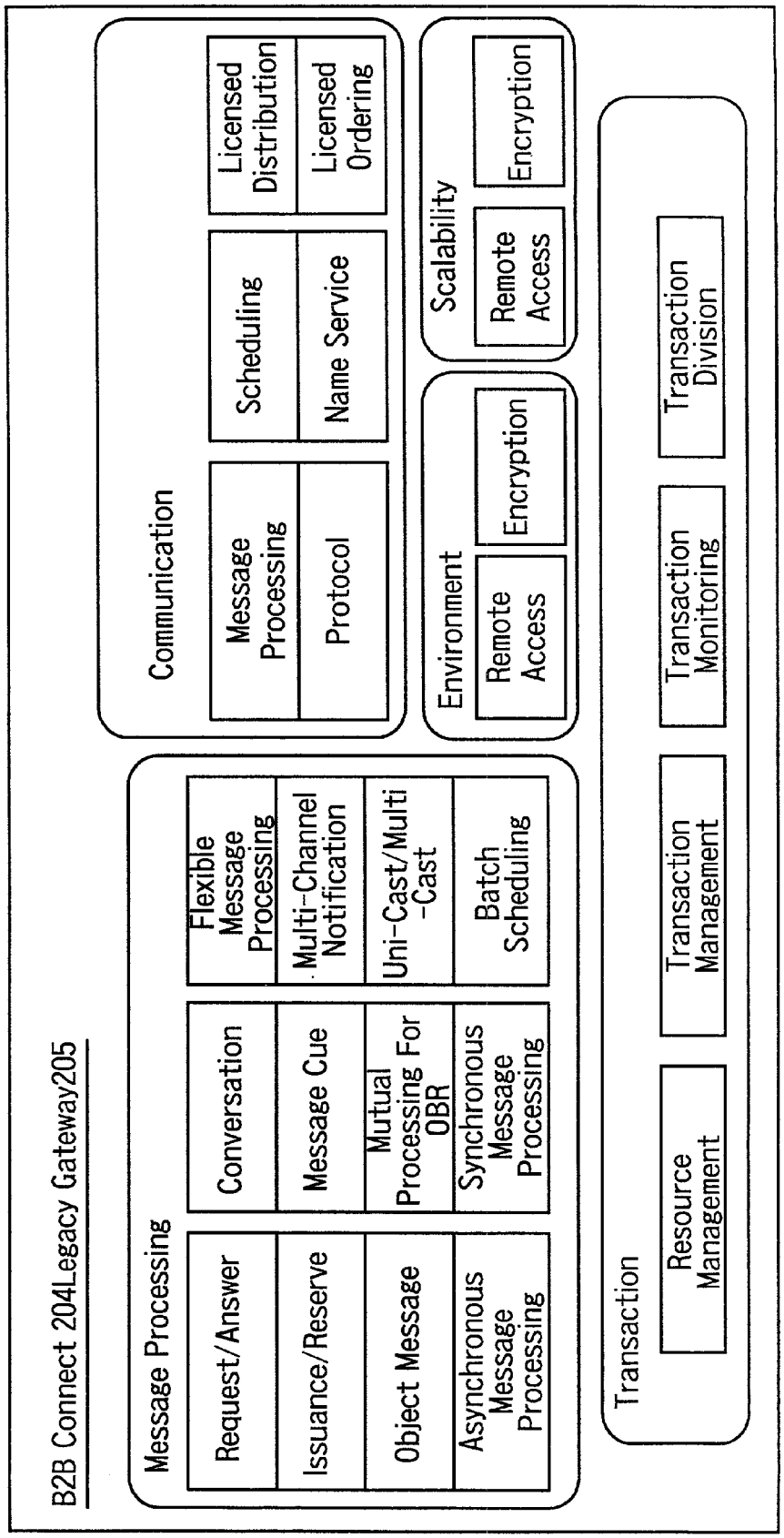
Figure 14:
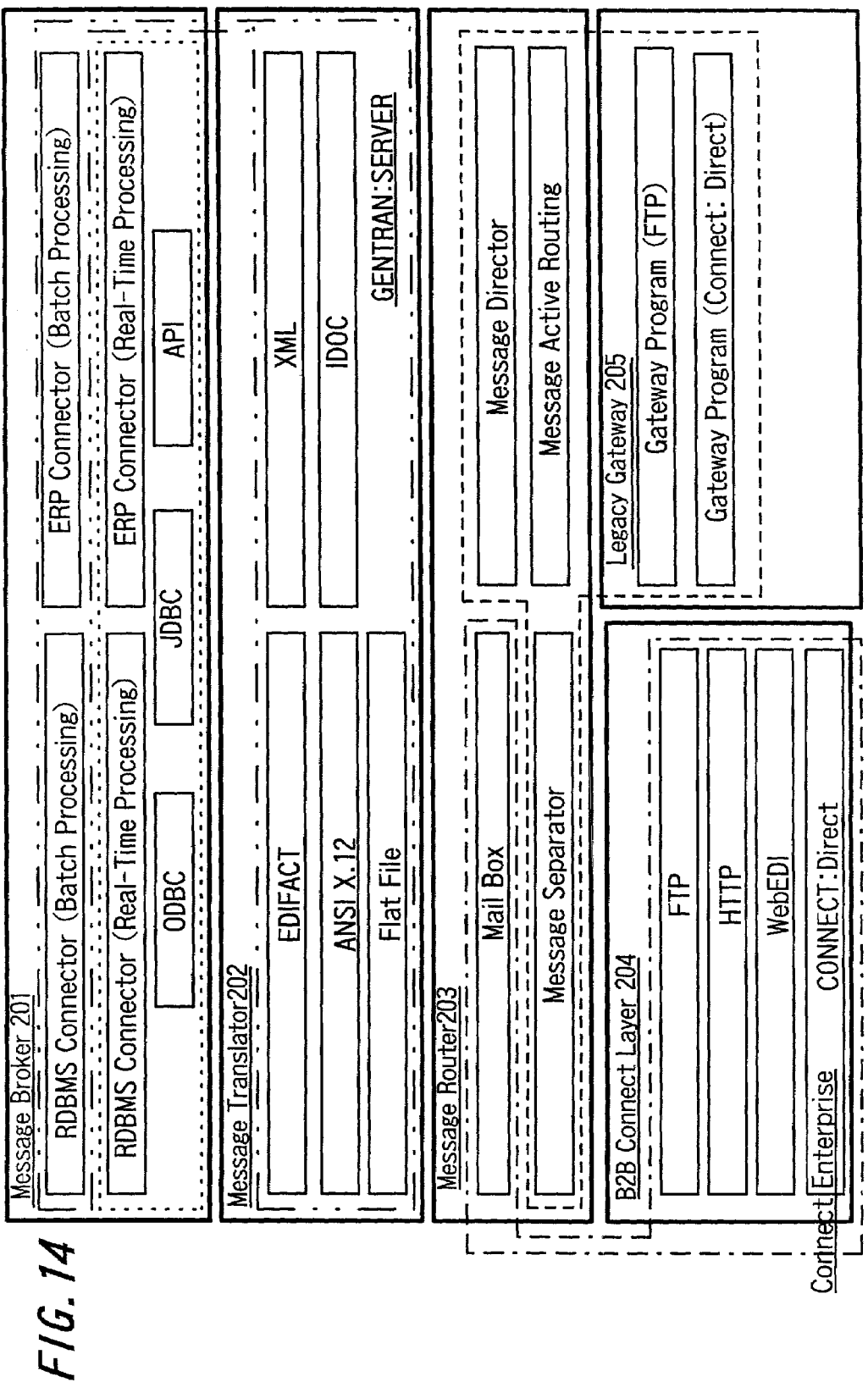
FIG. 14 is a diagram illustrating an example of a concrete product mapping that is applicable to the global message clearing system 200 according to the present embodiment.

FIG. 5 shows one example of an architecture model structure of the global clearing service 200 according to this embodiment, to which refers. (In FIG. 14 there is further illustrated an example of a concrete product mapping that can be applied to the global message clearing system 200 according to this embodiment. In this Figure, WEB METHOD is a product that is made by a Web Methods company; GEN TRAN: SERVER is a product that is made by a Sterling Commerce company; FTM is a product that is made by SONY ISS company: and Connect Enterpriser is a product that is made by a Sterling Commerce company.)

Subsequently, an explanation will be given of the flow of the processing between the trader site and the client site with the concentrated physical-distribution management system 20 according to this embodiment intervening in between.

Figure 6:
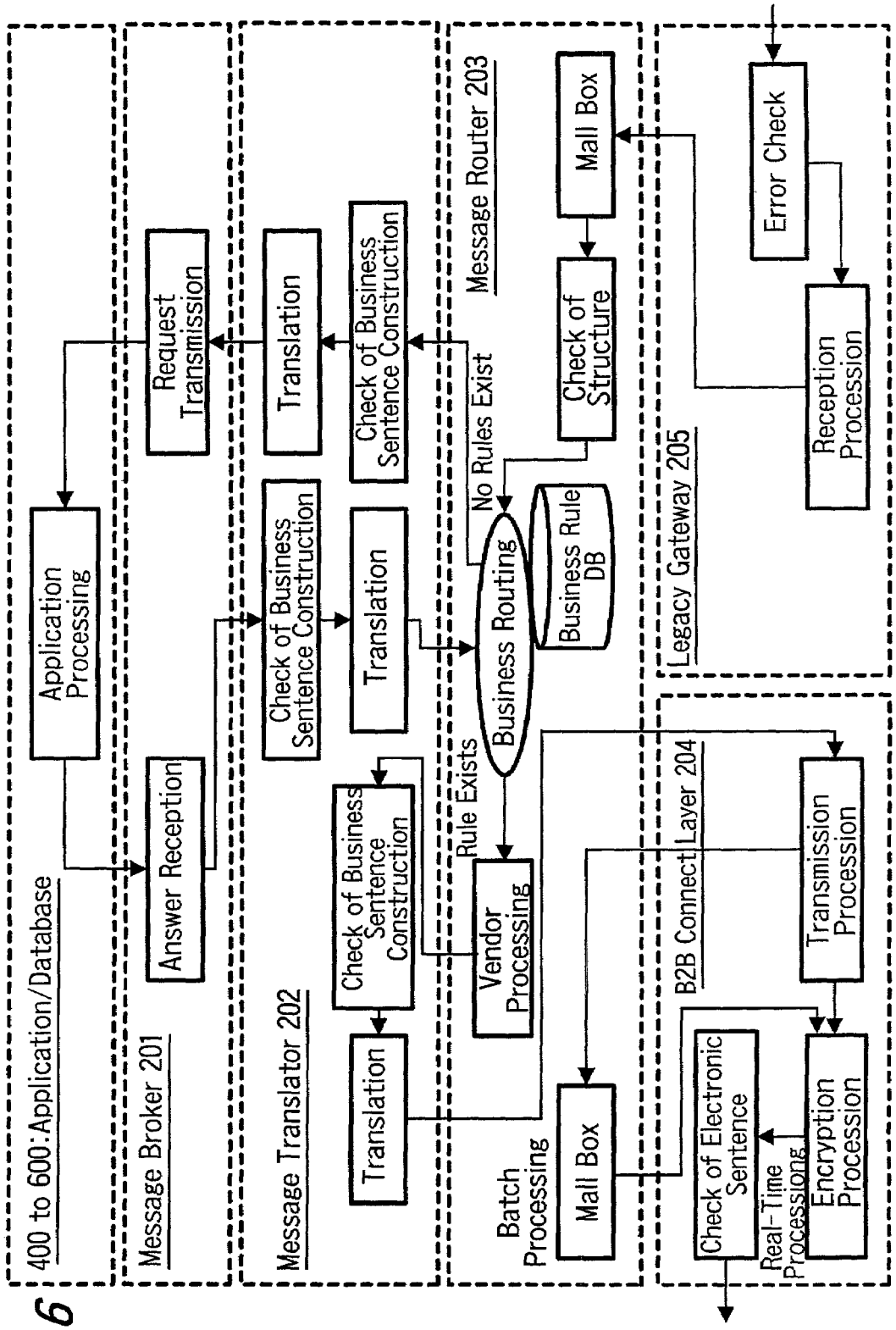
FIG. 6 is a diagram schematically illustrating a data flow wherein a message addressed from a local side inside an enterprise to an outside trader (business client) is processed within the global message clearing service 200.

FIG. 6 typically illustrates the flow through which the message addressed from a local site inside an enterprise to an outside transaction trader (vendor or business client) is processed within the global message clearing service 200. Hereinafter, while referring to FIG. 6, the processing procedure of a transmission message from the local site will be explained.

The message that has been transmitted from a local site inside an enterprise (or inside a particular group), first, in the legacy gateway 205, is subjected to a prescribed error check piece of processing and a prescribed piece of reception processing. Thereafter, it is accumulated within the mail box of the message router 203.

In the message router 203, the message is taken out from the mail box and has its structure checked. Then, business routing is performed of the message while referring to the business rules that have been converted into a database.

In case no relevant business rules exist within the rule database, in the message translator 202 business sentence construction check as well as translation is first performed on the message. Then, by way of the message broker 201, the message translator transmits a request to the service such as, for example, the relevant application/database 400 to 600.

The answer from the application/database 400 to 600 is returned by way of the message broker 201. And in the message translator 202, check of business sentence construction as well as translation is performed of that answer. Thereafter, this answer is thrown into the process of business routing once again. At the time of this process of business routing, there are extracted business rules from the application processing that was applied to the message. Those business rules are additionally registered in the business rule database.

In case business rules exist within the database, or in case having obtained business rules through the execution of the application processing, in the message router 203, vendor processing peculiar to the transaction trader (vendor) becoming a message transmission destination is executed using those business rules.

The after-vendor-processing message is further subjected to check of business sentence construction and translation within the message translator 202. Then, the message is transmission processed within the B2B connect layer 204 and is then accumulated in the mail box.

The message that has been accumulated in the mail box, thereafter, is taken out from the mail box is subjected to encryption processing and electronic sentence checking. It thereafter is transmitted toward a prescribed business client. Mailbox processing is generally processed in a batch form.

Or, the message after it has been transmission processed is directly subjected to encryption processing and electronic sentence checking, and is transmitted toward a prescribed business client. The transmission of the message in this case is real-time processed.

Figure 7:
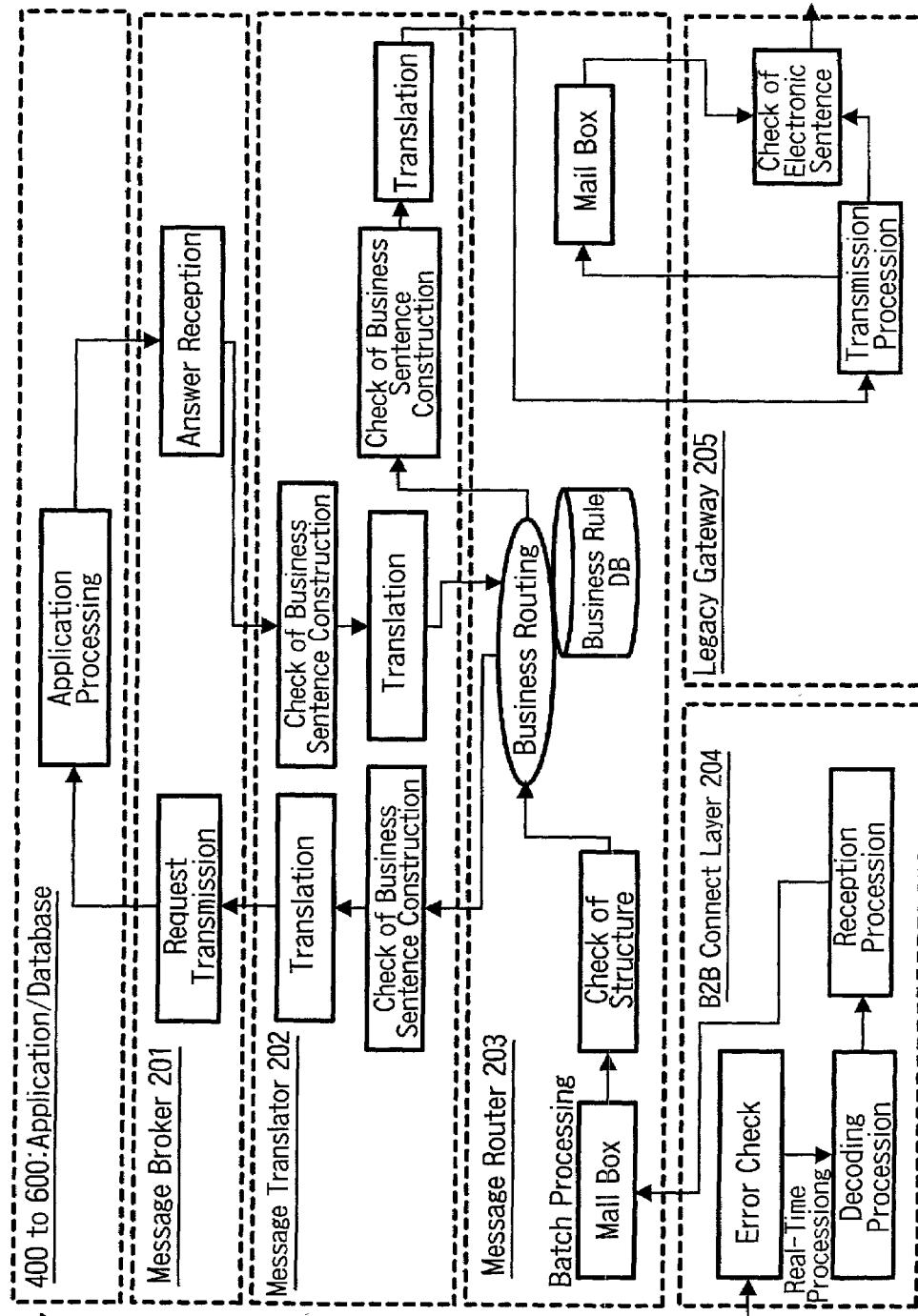
FIG. 7 is a diagram schematically illustrating a data flow wherein a message addressed from an outside trader (business client) to a local site inside an enterprise is processed within the global message clearing service 200.

Also, FIG. 7 typically illustrates the flow of data wherein the message addressed from an outside trader (business client) to a local site within an enterprise is processed within the global message clearing service 200. Hereafter, the processing sequence for a received message will be explained while referring to FIG. 7.

The message that has been transmitted from an outside business site, first, is subjected to prescribed error checking and reception processing in the B2B connect layer 204 and then is accumulated in the mail box of the message router 203.

In the message router 203, the message is taken out from the mail box and is subjected to structural check. Then business routing is performed of the message while referring to the database-converted business rules.

In case no relevant business rules exist within the business rule database, in the message translator 202, check of business sentence construction and translation are performed of the message. Thereafter, by way of the message broker 201, a request is transmitted to the relevant service such as the application/database 400 to 600.

The answer from the application/database 400 to 600 is returned via the message broker 201. In the message translator 202, the returned answer is subjected to check of business sentence construction and translation. The answer then is put into the process of business routing once again. At the time of this business routing, business rules are extracted from the application processing that has been executed with respect to the message. These business rules are additionally registered into the database.

In case business rules already exist within the business rule database, or in case having obtained business rules through the application processing, within the business router 203, using the business rules, business routing is performed.

Thereafter, the message is subjected to check of business sentence construction and translation within the message translator 202 and, thereafter, is transmission processed within the legacy gateway 250.

The message after transmission processed is accumulated once in the mail box, or has its electronic sentence checked. It then is transmitted toward a relevant local site.

Subsequently, various kinds of business-processing transactions that are performed between the trader site 60 and the local site 50 via the concentrated physical-distribution management system 20 according to this embodiment will be concretely explained with reference to the drawings.

Figure 8A:
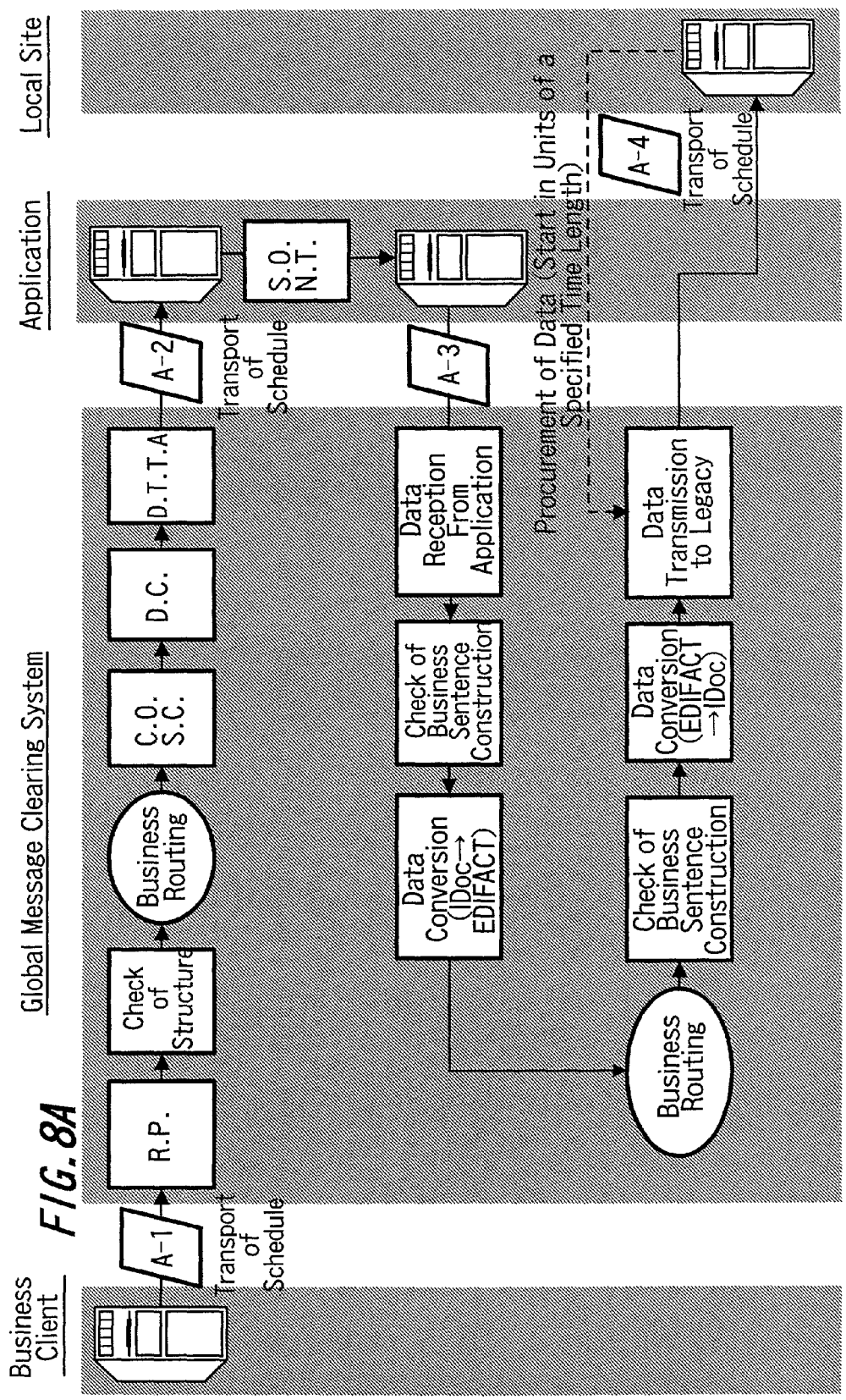
FIG. 8 consists of FIG. 8A and 8B, FIG. 8A showing a diagram schematically illustrating a business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is executed for the purpose of delivering a yearly made reservation from the business client to the local site before the final determination of the shipment schedule, and FIG. 8B showing an explanation of acronyms in FIG. 8A.

FIG. 8A illustrates the business processing transaction that is performed between the trader site, i.e. business client 60 and a local site 50 inside an enterprise (or inside a particular group) via the concentrated physical-distribution management system 20 according to this embodiment. The business processing transaction in this case illustrates the processing procedure for transmitted especially a one-year reservation made before final decision of the shipment schedule, from the business client 60 to the local site 50.

A transport schedule (transport schedule) message A-1 of a cargo that has been transmitted from the business client 50, within the global message clearing service 200, is reception processed by the B2B connect layer 204 and is further message structure checked by the message router 203.

Further, the transport schedule message is subjected to the process of business routing based on the use of the business rule by the message router 203. Subsequently, by the message translator 202, the sentence construction check of the message as well as data conversion thereof from the EDIFACT format into the IDoc format is performed thereon. It then is data transmitted to the relevant application via the message broker 201, as a transport schedule message A-2.

The relevant application updates the contents of the database according to the received transport schedule message A-2.

The application makes setup of a nomination table that is arranged to recommend a suitable one from among the presented transport schedules, and returns a transport schedule A-3 to the global message clearing service 200.

Within the global message clearing service 200, the transport schedule message A-3 that has been received from the application has its sentence construction checked by the message translator 202 and further has its data converted from the IDoc format again into the DIFACT format. Then it has performed thereon business routing with the use of the business rule by the message router 203.

The transport schedule message after subjected to business routing has its sentence construction checked by the message translator 202 and has its data converted. And then it is transmitted to the relevant local site 50 via the legacy gateway 205 as a transport schedule message A-4.

The local site 50 becoming the transmission destination and the data conversion processing that is to be applied are determined by the business rules according to the analyzed results of the main message body. Or, the local site becoming the transmission destination is determined according to the nomination table.

The data transmission made by the legacy gateway 205 is executed through the start of the local site 50 in units of a specified time length.

Figures 9, 9A:
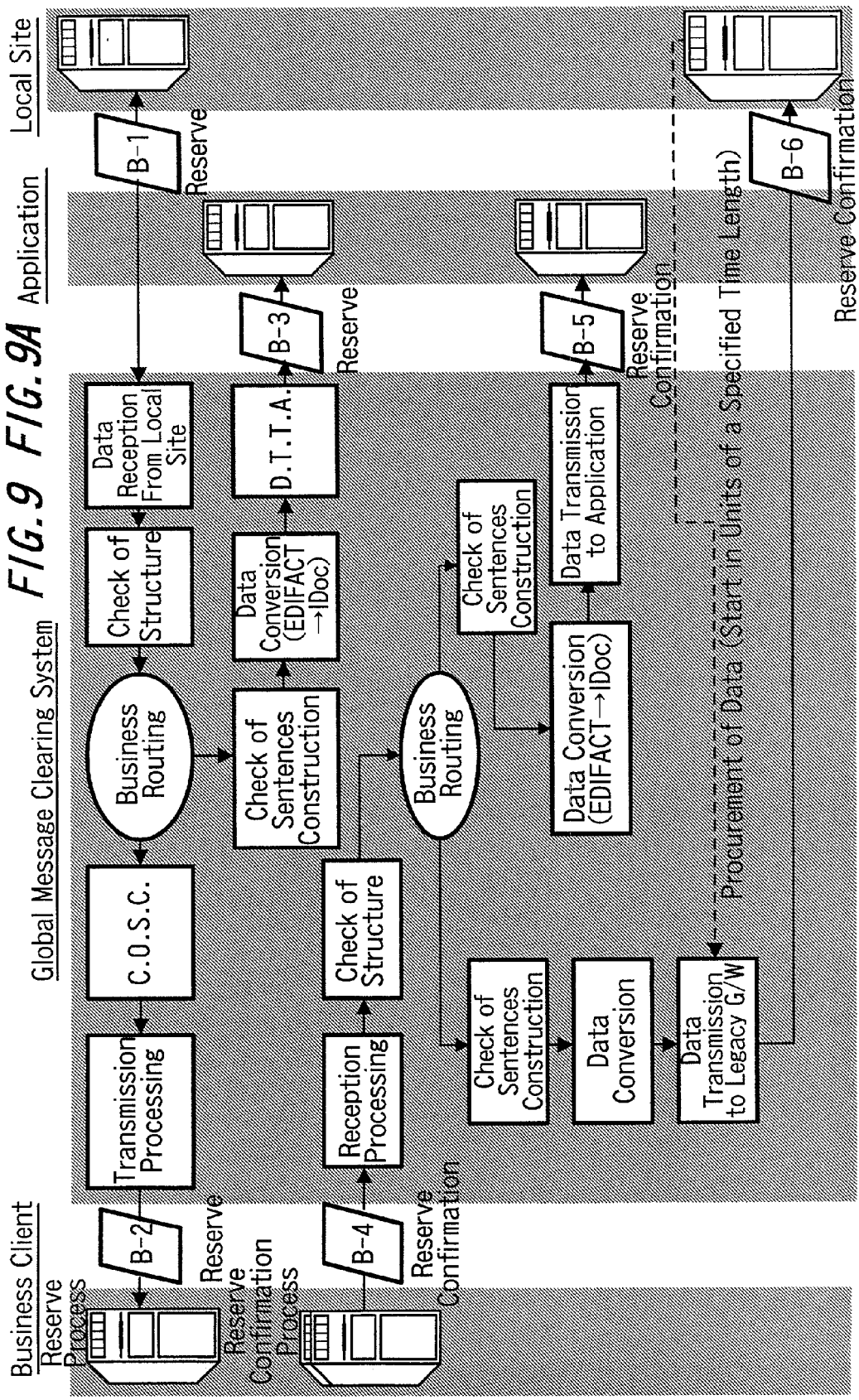
FIG. 9 consists of FIGS. 9A and 9B, FIG. 9A showing a diagram schematically illustrating the business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is performed when, after final decision of the shipment schedule and before the shipment instruction transmission, the local site 50 makes reservation with respect to the business client 60 while, on the other hand, the business client 60 makes reserve confirmation with respect to the local site 50, and FIG. 9B showing an explanation of acronyms in FIG. 9A.

Also, in FIG. 9A there is illustrated another example of the business-processing transaction that is performed between the trader site, i.e. business client 60 and a local site 50 inside an enterprise (or inside a particular group). The business-processing transaction in this case illustrates the processing procedure that, especially after final decision of the shipment schedule and before instruction of the shipment, permits the local site 50 to make reservation with respect to the business client 60 and permits the business client 60 to make confirmation on the reservation with respect to the local site 50.

A reserve message B-1 the local site 50 issues is reception processed by the legacy gateway 205 within the global message clearing service 200. Further, through the operation of the message router 203, that message has its sentence construction checked, and is subjected to business routing based on the business rule, by the message router 203.

The reserve message after subjected to business routing is subjected to sentence construction check as well as to data conversion. And it as a reserve message B-2 is transmitted to a relevant business client 60 via the B2B connect layer 204.

The business client 60 becoming a transmission destination and the data conversion processing that is to be applied are determined by the business rule according to the analyzed results of the main message body.

Also, the reserve message after subjected to business routing, through the message router 203, has its sentence construction checked and has its data conversion performed from EDIFACT format into the IDoc format. Then it as a reserve message B-3 is transmitted to a relevant application via the message broker 201.

The application updates the contents of the database according to its received reserve message B-3.

On the other hand, a reserve confirmation message B-4 that is issued from the business client 60, within the global message clearing service 200, is reception processed by the B2B connect layer 204, and further is message structure checked by the message router 203

The reserve confirmation message, further, has business routing performed thereon according to the business rule. And it then has its sentence construction checked by the message translator 202 and has its data format converted thereby from the EDIFACT format into IDoc format. Thereafter, it as a reserve confirmation message B-5 is data transmitted to a relevant application by way of the message broker 201.

The application updates the contents of the database according to its received reserve confirmation message B-5.

Also, the reserve confirmation message after its being subjected to business routing has its sentence construction checked and has its data conversion performed by the message router 203. Then it as a reserve confirmation message B-6 is transmitted to the local site 50 via the legacy gateway 205.

The local site 50 becoming a transmission destination and the data conversion processing that is to be applied are determined using, or, in accordance with, the business rule according to the analyzed results of the main message body.

The data transmission the transmission of that is made by the legacy gateway 205 is executed through starting of, for example, the local site 50 in units of a specified time length.

Also, in FIG. 10A, there is illustrated another example of the business processing transaction that is performed between the trader site, i.e. the business client 60 and a local site 50 inside an enterprise (or inside a particular group) via the concentrated physical-distribution management system 20 according to this embodiment. The business processing transaction in this case illustrates the processing procedure that permits especially the local site 50 to make a delivery order (D/O) and a shipment instruction with respect to the business client 60.

A D/O message C-1 the local site 50 issues, within the global message clearing service 200, is reception processed by the legacy gateway 205. Further, it through the operation of the message router 203 has its sentence construction checked and has performed thereon business routing based on the business rule.

The D/O message after its being subjected to the business routing, through the operation of the message router 203, has its sentence construction checked and has its data converted into a relevant format. And it as a D/O message C-2 is transmitted to the relevant business client 60 via the B2B connect layer 204.

The business client 60 becoming a transmission destination and the data conversion processing to be applied are determined using the business rule according to the analyzed results of the main message body.

Also, the D/O message after business routing processed, through the operation of the message router 203, has its sentence construction checked and has its data format converted from the EDIFACT format into the IDoc format. Then it as a D/O message C-3 is transmitted to a relevant application via the message broker 201.

The application updates the contents of the database according to its received D/O message C-3.

After the delivery order, when the local site 50 issues a shipment instruction, within the global message clearing service 200, the shipment instruction is received by the legacy gateway 205 and, further, has its sentence construction checked by the message router 203 as well as has performed thereon business routing based on the business rule.

In case the business rule for the shipment instruction is already set, a shipment instruction message is produced according to the shipment instruction. This shipment instruction message, through the message router 203, has its sentence construction checked and has its relevant data conversion performed. And it then as a shipment instruction message C-7 is transmitted to a relevant business client 60 via the B2B connect layer 204.

The business client 60 becoming a transmission destination and the data conversion processing to be applied are determined using the business rule according to the analyzed results of the main body of the message.

On the other hand, in case business rules with respect to the shipment instruction are yet set, the shipment instruction, through the operation of the message router 203, has its sentence construction checked and has its data conversion performed from the EDIFACT format into the IDoc format. Then it as a shipment instruction data C-9 is transmitted to a relevant application via the message broker 201.

The application that has received the shipment instruction message executes shipment processing by referring to the associated database. Then it returns the message to the global message clearing service 200 as the shipment instruction message C-4.

Within the global message clearing service 200, the shipment instruction message C-4 that has been received from the application, through the message translator 202, has its sentence construction checked and further has its data conversion performed from the IDoc format again into the EDIFACT format. Then it through the operation of the message router 203 has performed thereon business routing based on the use of the business rule.

The shipment instruction message after its having performed thereon business routing, through the operation of the message router 203, has its sentence construction checked and has its relevant data conversion. Then it as the shipment instruction message C-7 is transmitted to the relevant business client 60 via the B2B connect layer 204 (same as above).

Figures 11, 11A:
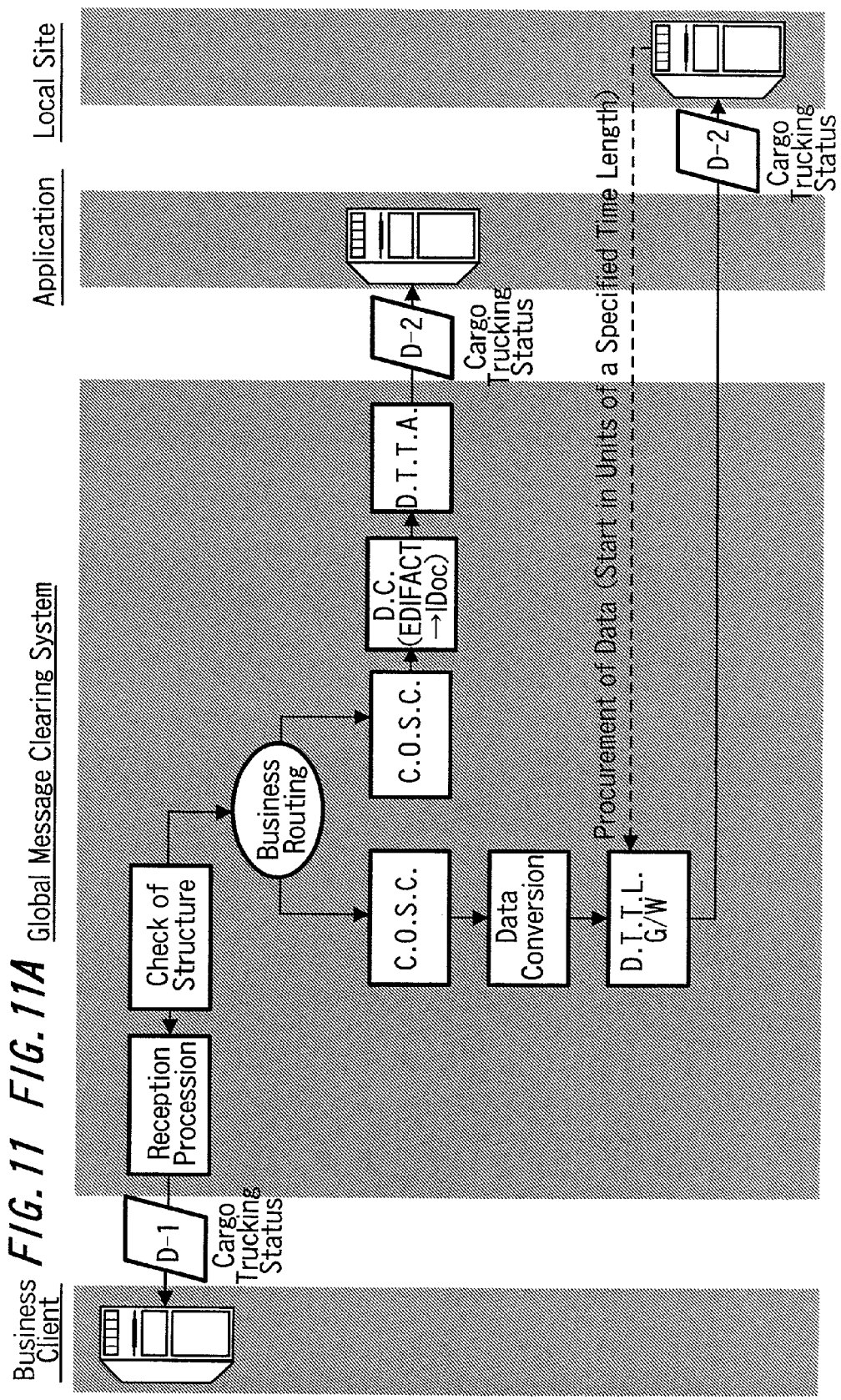
FIG. 11 consists of FIGS. 11A and 11B, FIG. 11A showing a diagram schematically illustrating the business processing transaction that is performed between a trader site, i.e. business client 60 and a local site 50 inside an enterprise (or inside a particular group) via the concentrated physical-distribution management system 20 according to the present embodiment, or, more concretely, a diagram illustrating the processing procedure that is executed when the business client 60 makes cargo status reference to the local site 50, and FIG. 11B showing an explanation of acronyms in FIG. 11A.

Also, FIG. 11A illustrates another example of the business processing transaction that is performed between the trader site, i.e. business client 60 and a local site 50 inside an enterprise (or inside a particular group) via the concentrated physical-distribution management system 20 according to this embodiment. The business processing transaction in this case illustrates the processing procedure that especially permits the business client 60 to make reference to the status of cargo with respect to the local site 50.

The cargo trucking status message D-1 that is issued from the business client 60 is reception processed by the B2B connect layer 204 within the global message clearing service 200 and, further, by the message router layer 203, is subjected to structure checking of the message.

The cargo trucking circumstance message, further, in the message router 203, has performed thereon business routing based on the business rule. In the message translator 202, it has performed thereon sentence construction check and in addition has performed thereon data conversion from the EDIFACT format into the IDoc format. Then it as a cargo trucking status message D-2 is data transmitted to the relevant application by way of the message broker 201.

The application updates the contents of the database according to its received cargo trucking status message D-2.

Also, the cargo trucking status message after its being subjected to business routing, in the message router 203, has its sentence construction checked and performed thereon relevant data conversion. Then it as a cargo trucking status message D-3 is transmitted to a relevant local site 50 via the legacy gateway 205.

The local site 50 becoming a transmission destination and the data conversion processing that is to be applied are determined using the business rule according to the analyzed results of the main body of the message.

The data transmission made by the legacy gateway 205 is executed through start of, for example, the local site 50 in units of a specified time length.

Also, FIG. 12A illustrates another example of the business processing transaction that is performed between the trader site, i.e. business client 60 and a local site 50 inside an enterprise (or inside a particular group) via the concentrated physical-distribution management system 20 according to this embodiment. The business processing transaction in this case illustrates especially the processing procedure that performs actual results/claim (sales trigger) with respect to the local site 50.

The application, in response to the cargo status having reached a prescribed value, issues a sales trigger. The sales trigger message E-1 the application has issued is received via the message broker 201 and in the message translator 202 has its sentence construction checked and further has its data format converted from the IDoc format again into the EDIFACT format. Then it in the message router 203 has performed thereon business routing based on the business rule.

The sales trigger message after business routing, in the message router 203, has its sentence construction checked and has its data subjected to relevant conversion. Then it as a sales trigger message E-2 is transmitted to a relevant local site 50 via the legacy gateway 205.

The local site 50 becoming a transmission destination and the data conversion processing to be applied are determined using the business rule according to the analyzed results of the main body of the message.

The data transmission made by the legacy gateway 205 is executed, for example, through the start of the local site 50 in units of a specified time length.

Also, FIG. 13 illustrates another example of the business transaction that is performed between the trader site, i.e. business client 60 and a local site 50 inside an enterprise (or inside a particular group) via the concentrated physical-distribution management system 20 according to this embodiment. The business processing transaction in this case illustrates the processing procedure that especially permits the local site 50 to perform location management of the cargoes The location information message F-1 the local site 50 issues is received via the legacy gateway 205. Then it in the message router 203 is subjected to check of the structure and in the message router 203 is subjected to business routing based on the business rule.

The location information message after business routing, in the message translator 202, has its sentence construction checked and has its data converted from the EDIFACT format into the IDoc format. Then it as a location information message E-2 is data transmitted to a relevant application via the message broker 201.

The application updates the contents of the database according to its received location information message E-2.

The technical effects and their subsidiary effects that are brought about by the concentrated physical-distribution management system 20 according to this embodiment will be enumerated below.

(1) The transmission destination the transmission of that is made from the client site and each corresponding one of the respective trader sites, the both being network-connected to one another via the concentrated physical-distribution management system 20, is at all times the global message clearing system 200, which determines the transmission destination for data. Accordingly, the transmission origin for data can make data transmission regarding an order made or received for a thing or service with no consciousness of the opponent partner.

(2) Since the message translator 202, according to the determined opponent partner, performs format conversion of transmission data (EDIFACT, ANSI 12, XML, etc.), the data transmission origin can make data transmission with no consciousness of the reception side data format.

(3) Since the B2B connect layer 204 performs automatic protocol conversion (FTP, HTTP, etc.) in correspondence with the reception side, the data transmission origin can make data transmission with no consciousness of the communication form of the reception side.

(4) Since encryption is performed of the transmission data according to the encryption method (VPN, SSL, etc.) corresponding to the reception side, the data transmission origin can make data transmission with no consciousness of the reception side encryption method.

(5) It becomes unnecessary to make settings for N:N transmission and therefore the operation/management of the concentrated physical-distribution management service is simplified.

(6) In the global message clearing system 200 the transmission protocol, IP address, encryption method, decipher key, etc. are integration managed. So the operation is simplified through integration-management of the Internet attribute items.

(7) Information cooperation or linkage is made efficient and simplified because the operation is done with no intermediary of batch processing.

(8) Through applying the Internet communication in order to manage the physical distribution, the communication cost is reduced.

(9) The system dynamically performs conversion of 1:N, N:1, and N:N (performs data division in units of a destination site).

(10) The system can automatically update the code table, for example by performing automatic deletion of non-used data through transaction.

(11) In the 1-site: multi-site communication, the system enables asynchronous communication, so that re-transmission processings of information as well as delivery/arrival confirmations are all performed through the global message clearing system 200. As a result of this, it is possible to mitigate the processing burden on the data transmission side.

(12) Through the use of the Internet and the portal sites in the concentrated physical-distribution management, the information cooperation destinations are unitized regardless of the transaction partners and therefore the costs for both the clients and the traders are reduced.

(13) The portal site administrator that performs the concentrated physical-distribution management collects part of the reduced costs from one, or both, of the clients and the traders as the utilization fee to thereby finance the administration expenses and gain profits. For example, it may be arranged that money-charging processing be executed correspondingly to the amount of transmission data, the customer profile, the contact volume the contracts of that are made through the intermediary of the concentrated physical-distribution management system 20, etc.

(14) By disposing within the concentrated physical-distribution system 20 the quality-ranking evaluation function, optimum trader selection function, etc. of the trader, it is possible to promote and uplift the will to compete between the same kinds of fields of traders and thereby realize the enhancement of the quality, as well as the maintenance of the rationality, of a thing or service.

(15) By making an order or receiving it through the global message clearing system 200, it is possible to dynamically select the transaction partner at all times and cause advantageous development of the business which abates the external limitations.

(16) Regarding a thing or service the goods value of that is increased by degrees through repeated information cooperation between the client and the trader, as well, through the use of the portal sites, it is possible to realize the both partner's cost reductions and time shortenings.

(17) By adopting as the information cooperation the standard that is virtually a world standard, the multi-site vs. multi-site's connection becomes easy, which can lead to the increase in the number of portal-site utilizers.

(18) By adopting as the encryption method the standard that is virtually a world standard, it is possible to safeguard the secrecy of the general physical-distribution management system 10 as a whole.

(19) Provision of the global stock location information on a thing or service by the concentrated physical-distribution management system 20 can make the supply/demand balance proper.

(20) By, after making an order for a thing or service, providing the information on the progress of the order, it is possible to cope with the very urgent intention decision and actions such as the change in the contents of the order.

(21) By collectively making price settlement in purchasing a thing or service and addition of the insurance therefor, it is possible to decrease the client's burden and resultantly increase the number of the portal-site utilizers.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

What is claimed is:

1. An information processing apparatus for processing transmission of a message, said apparatus comprising:
    a gateway operable to provide a local message exchange interface with a plurality of local sites of a system;
    a B2B connector operable to provide a message exchange interface between the system and a plurality of sites external to the system;
    a message translator operable to perform conversion between any two of a plurality of message formats on a message received from a sending site that is one of the plurality of local sites or one of the plurality of external sites, said conversion being performed in response to a field that is contained in the message and which serves as a trigger for a specific one of the plurality of message formats, and to check sentence construction of the message prior to performing said translation of the message;
    a message broker operable to transmit a request to and receive an answer from an application or database that is needed to carry out data exchange processing between the sending site and at least one destination site;
    a message router operable to add a destination address to the message according to an associated piece of identification information contained in the message, to combine the message with another message having the destination address when the another message exists, the another message being received from another one of the plurality of local sites or from another one of the plurality of external sites, and to decompose the message into a plurality of messages corresponding to a plurality of a destination addresses when the piece of identification information is associated with the plurality of a destination addresses;
    said B2B connector being operable to process the addressed message or the plurality of addressed messages for transmission to one or more of the plurality of external sites when the message was received from the one of the plurality of local sites; and
    said gateway being operable to process the addressed message or the plurality of addressed messages for transmission to one or more of the plurality of local sites when the message was received from the one of the plurality of external sites.

2. The information processing apparatus according to claim 1, wherein said message translator is operable to specify a transmission destination of the message according to a transmission origin of the message and contents of the message.

3. The information processing apparatus according to claim 1, wherein said message translator is operable to perform automatic protocol conversion according to a message transmission destination specified according to a transmission origin of the message and contents of the message.

4. The information processing apparatus according to claim 1, wherein said message translator is operable to execute encryption processing that corresponds to a message transmission destination that is specified according to a transmission origin of the message and contents of the message.

5. The information processing apparatus according to claim 1, wherein said message router includes:
    a message separator operable to decompose the message into the plurality of messages corresponding to the plurality of destination addresses,
    a mail box operable to retain the plurality of messages corresponding to the plurality of destination addresses, and
    a message director operable to determine the transmission destination of the message according to the contents of the message.

6. The information processing apparatus according to claim 1, wherein said message router includes:
    a rule accumulation part operable to accumulate a plurality of rules for executing said message conversion performed by said message translator,
    said message broker being operable to transmit the request to and receive the answer from the application or database if no rules exist that are applicable to the message, and said rule accumulation part being operable to extract a new rule from the answer received from the application or database.

7. The information processing apparatus according to claim 1, wherein said message translator is operable to convert the message into a prescribed format according to a transmission origin of the message and contents of the message.

8. A method of processing transmission of a message, said method comprising:
    providing a local message exchange interface with a plurality of local sites of a system;
    providing an external message exchange interface between the system and a plurality of sites external to the system;
    receiving a message from a sending site that is one of the plurality of local sites or one of the plurality of external sites;
    checking sentence construction of the message;
    performing conversion between any two of a plurality of message formats on the message in response to a field that is contained in the message and which serves as a trigger for a specific one of the plurality of message formats;
    transmitting a request to and receiving an answer from an application or database that is needed to carry out data exchange processing between the sending site and at least one destination site;
    adding a destination address to the message according to an associated piece of identification information contained in the message;

combining the message with another message having the destination address when the another message exists, the another message being received from another one of the plurality of local sites or from another one of the plurality of external sites;

decomposing the message into a plurality of messages corresponding to a plurality of a destination addresses when the piece of identification information is associated with the plurality of a destination addresses;

processing the addressed message or the plurality of addressed messages for transmission to one or more of the plurality of external sites using the external message exchange interface when the message was received from the one of the plurality of local sites; and processing the addressed message or the plurality of addressed messages for transmission to the destination address or to the plurality of destination addresses using the local message exchange interface when the message was received from the one of the plurality of external sites.

9. The information processing method according to claim 8, wherein said step of performing conversion on the message includes converting the message into a prescribed format according to a transmission origin of the message and contents of the message.

10. The information processing method according to claim 8, wherein said step of performing conversion on the message includes specifying a message transmission destination according to a transmission origin of the message and contents of the message.

11. The information processing method according to claim 8, wherein said step of performing conversion on the message includes performing automatic protocol conversion in correspondence with a message transmission destination specified according to a transmission origin of the message and contents of the message.

12. The information processing method according to claim 8, wherein said step of performing conversion on the message includes performing encryption processing in correspondence with a message transmission destination specified according to a transmission origin of the message and contents of the message.

13. The information processing method according to claim 8, wherein said step of adding a destination address includes:

retaining in a mail box the plurality of messages corresponding to the plurality of destination addresses, and determining the transmission destination of the message according to the contents of the message.

14. The information processing method according to claim 8, wherein said step of adding a destination address includes:

accumulating a plurality of rules for executing said message conversion step, and if no rules exist that are applicable to the message, extracting a new rule from the answer received from the application or database.

15. A network system, comprising:

a plurality of local sites; and a server operable to control message transmission to or from a given one of said plurality of local sites said server including:

a gateway operable to provide a local message exchange interface with said plurality of local sites, a B2B connector operable to provide an external message exchange interface between the system and a plurality of sites external to the system, a message translator operable to performs conversion between any two of a plurality of message formats on a message received from a sending site that is one of said plurality of local sites or one of the plurality of external sites, said conversion being performed in response to a field that is contained in the message and which serves as a trigger for a specific one of the plurality of message format, and to check sentence construction of the message prior to performing said translation of the message, a message broker operable to transmit a request to and to receive an answer from an application or database that is needed to carry out data exchange processing between the sending site and at least one destination site, a message router operable to add a destination address to the message according to an associated piece of identification information contained in the message, to combine the message with another message having the destination address when the another message exists, the another message being received from another one of the plurality of local sites or from another one of the plurality of external sites, and to decompose the message into a plurality of messages corresponding to a plurality of a destination addresses when the piece of identification information is associated with the plurality of a destination addresses, said B2B connector being operable to process the addressed message or the plurality of addressed messages for transmission to one or more of the plurality of external sites when the message was received from the one of the plurality of local sites, and said gateway being operable to process the addressed message or the plurality of addressed messages for transmission to one or more of the plurality of local sites when the message was received from the one of the plurality of external sites.

16. The network system according to claim 15, wherein said message translator is operable to convert the message into a prescribed format according to a transmission origin of the message and contents of the message.

17. The network system according to claim 15, wherein said message translator is operable to specify a message transmission destination according to a transmission origin of the message and contents of the message.

18. The network system according to claim 15, wherein said message translator is operable to performs automatic protocol conversion according to a message transmission destination specified according to a transmission origin of the message and contents of the message.

19. The network system according to claim 15, wherein said message translator is operable to performs encryption processing in correspondence with a message transmission destination specified according to a transmission origin of the message and contents of the message.

20. The network system according to claim 15, wherein said message router includes:

a message separator operable to decompose the message into the plurality of messages corresponding to the plurality of a destination addresses, a mail box operable to retain the plurality of messages corresponding to the plurality of destination addresses, and a message director operable to determine the transmission destination of the message according to the contents of the message.

21. The network system according to claim 15, wherein said message router includes:

a rule accumulation part operable to accumulate a plurality of rules for executing said message conversion performed by said message translator, said message broker being operable to transmit the request to and receive the answer from the upper-order application or database if no rules exist that are applicable to the message, and said rule accumulation part being operable to extract a new rule from the answer received from the upper-order application or database.

* * * * *

UNITED STATES PATENT AND TRADEMARK OFFICE
CERTIFICATE OF CORRECTION

PATENT NO.        : 7,359,942 B2                                   Page 1 of 1
APPLICATION NO. : 10/008443
DATED             : April 15, 2008
INVENTOR(S)       : Yasumasa Mizushima et al.

It is certified that error appears in the above-identified patent and that said Letters Patent is hereby corrected as shown below:

Column 16, line 52, after "form", insert --.--.

Column 27, line 61, after "sites", insert --,--.

Column 28, line 1, "performs" should read --perform--.

Column 28, line 8, "format" should read --formats--.

Column 28, line 50, "performs" should read --perform--.

Column 28, line 56, "performs" should read --perform--.

Signed and Sealed this

Sixteenth Day of June, 2009

JOHN DOLL
*Acting Director of the United States Patent and Trademark Office*